United States Patent [19]
Inagawa et al.

[11] Patent Number: 5,835,464
[45] Date of Patent: Nov. 10, 1998

[54] DISC DATA REPRODUCING APPARATUS AND SIGNAL PROCESSING CIRCUIT

[75] Inventors: Jun Inagawa; Yasuhiro Hayashi; Hiroshi Kobata, all of Kanagawa-ken, Japan

[73] Assignee: Kabushiki Kaisha Toshiba, Kanagawa-ken, Japan

[21] Appl. No.: 994,641

[22] Filed: Dec. 19, 1997

Related U.S. Application Data

[63] Continuation of Ser. No. 288,785, Aug. 12, 1994.

[30] Foreign Application Priority Data

Aug. 14, 1993 [JP] Japan .................................. 5-222179
Nov. 8, 1993 [JP] Japan .................................. 5-300836
Feb. 23, 1994 [JP] Japan .................................. 6-051350

[51] Int. Cl.⁶ .................................................... G11B 7/00
[52] U.S. Cl. ............................ 369/50; 369/58; 369/59; 360/51
[58] Field of Search .......................... 369/50, 47, 48, 369/49, 54, 58, 59, 60, 32, 124; 360/48, 53, 51

[56] References Cited

U.S. PATENT DOCUMENTS

| | | |
|---|---|---|
| 4,603,412 | 7/1986 | Yamazaki . |
| 4,631,714 | 12/1986 | Kahlman et al. . |
| 5,170,386 | 12/1992 | Tateishi . |
| 5,469,417 | 11/1995 | Tanoue et al. . |
| 5,508,985 | 4/1996 | Fairchild et al. . |
| 5,535,183 | 7/1996 | Miura et al. . |
| 5,553,041 | 9/1996 | Inagawa et al. . |
| 5,563,860 | 10/1996 | Kubo et al. . |
| 5,574,710 | 11/1996 | Kimura et al. . |
| 5,592,458 | 1/1997 | Kobunaya . |

FOREIGN PATENT DOCUMENTS

| | | |
|---|---|---|
| 0046231A1 | 2/1982 | European Pat. Off. . |
| 0096162A1 | 12/1983 | European Pat. Off. . |
| 0096164A2 | 12/1983 | European Pat. Off. . |
| 00400810A2 | 12/1990 | European Pat. Off. . |
| 0400810A3 | 12/1990 | European Pat. Off. . |
| 0485234A2 | 5/1992 | European Pat. Off. . |
| 0534883A1 | 3/1993 | European Pat. Off. . |
| 2 492 149 | 4/1982 | France . |
| 4103973A1 | 8/1992 | Germany . |
| 5-028632 | 2/1993 | Japan . |
| 5-189885 | 7/1993 | Japan . |
| 6-119710 | 4/1994 | Japan . |

*Primary Examiner*—Muhammad N. Edun
*Attorney, Agent, or Firm*—Finnegan, Henderson, Farabow, Garrett & Dunner, L.L.P.

[57] ABSTRACT

An apparatus, a signal processing circuit and a method for reproducing data stored on a disc to prevent a buffer memory from experiencing overflow/underflow. Writing information data read from the disc to the buffer memory is performed in response to a reproduction stage clock, and reading from the buffer memory is in response to a signal processing stage clock. The signal processing stage clock for reading information data may be derived from the reproduction stage clock.

44 Claims, 15 Drawing Sheets

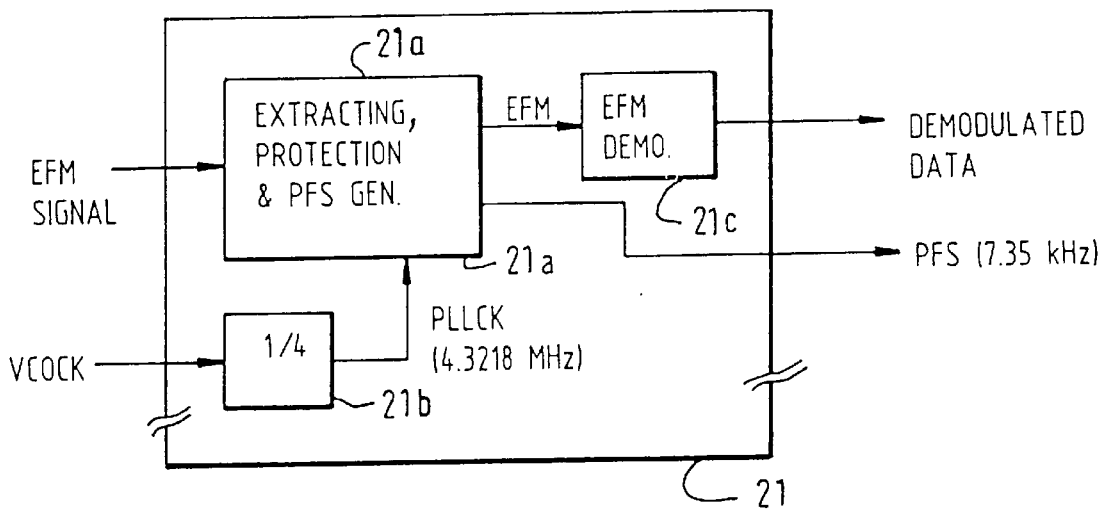
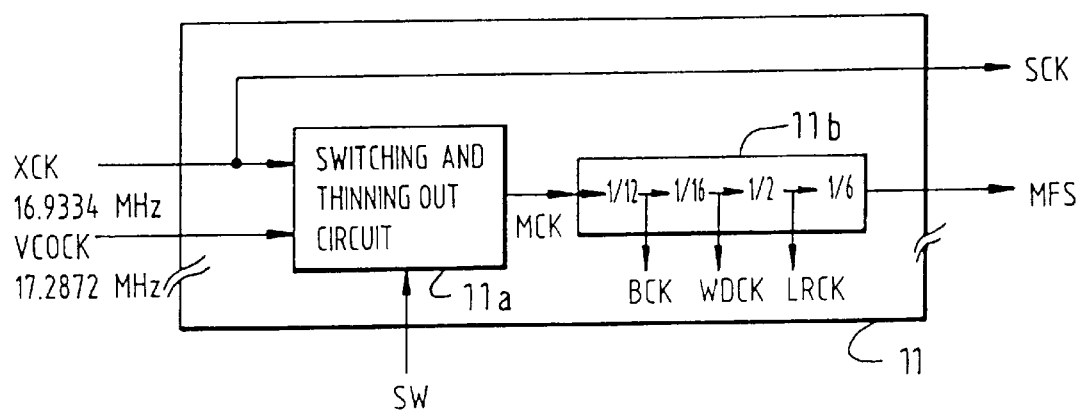

DISC DATA REPRODUCING APPARATUS AND SIGNAL PROCESSING CIRCUIT

FIELD OF THE INVENTION

This is a continuation of application Ser. No. 08/288,785, filed Aug. 12, 1994, which is hereby incorporated by reference.

The present invention generally relates to an optical record disc player such as the compact disc player, its signal processing circuit and a method for data reproduction, and more particularly, to apparatus and method for reading out reproduced data from a buffer memory.

BACKGROUND OF THE INVENTION

As is well known in the field of audio equipment, digital record reproducing systems have been generally adopted for the purpose of reproducing recorded data of high density and high fidelity. In these systems, audio analog signals are converted into digitized data by a PCM (Pulse Code Modulation) technique and this data is recorded on a recording medium, such as a disc or a magnetic tape, to be reproduced. Among these systems, the compact disc is mainly used at present. In this case, a binary digit (bit) corresponding to the digitized data is formed on a disc of about 12 cm in diameter, and is optically read.

A reproducing device for reproducing the data recorded on the compact disc as described above, moves an optical pickup provided with a semiconductor laser and a photo-electric conversion device in a constant linear velocity tracking system (CLV) from the inner periphery side to the outer periphery side of the disc, and by rotating the compact disc the data recorded on the compact disc may be read.

The data read out from the disc is supplied to an RF circuit. This RF circuit extracts a focus error signal and tracking error signal from an output of the optical pickup, and supplies a servo control circuit with these extracted signals. The RF circuit also quantizes the signal read from the disc, and supplies a signal processing circuit with the quantized signal as an eight to fourteen bit modulated (EFM) signal. This signal processing circuit operates an EFM demodulation, a subcode demodulation and an error correction processing, then its output is supplied to a D/A (digital/analog) converter (hereinafter called DAC). An output of the DAC is supplied to a low pass filter (LPF), and an output of the LPF corresponds to a reproduced audio output signal. In a reproduction device used with a CD, in order to prevent a final audio output from causing wow and flutter, the EFM demodulated signal is stored in a buffer memory and read out after the error correction processing using a stable frequency clock signal. This clock signal is synchronous with a clock signal generated by :a crystal oscillator.

Besides the well-known audio CD player, a CD-ROM player is another reproducing apparatus using discs. The CD-ROM player reproduces two kinds of data co-existing on the disc, i.e. an audio signal and ROM data, such as image information and character codes. When the audio signal is read out, the reproduction is performed at a normal rate corresponding to audible information. On the other hand, when ROM data is read out, the reproduction is performed at a faster rate, such as a double rate. In such a CD-ROM player, frequent switching from the normal rate to the double rate or from the double rate to the normal rate is performed.

As shown in FIG. 1, to change the reproduction rate, a rate control signal (HS) is used. When the signal HS is changed from "L" to "H". the rate is switched from the normal rate to the double rate, and when the signal HS is changed from "H" to "L", the rate is switched from the double rate to the normal rate. In such cases, the rotation speed of a disc motor does not change instantaneously but changes gradually from the normal rate to the double rate or from the double rate to the normal rate. As a result, a frequency of a reproduction stage clock (VCOCK) generated by a PLL circuit in accordance with the rotation speed of the disc motor flutters frequently in accordance with the motor rotation. The reproduction stage clock controls the rate at which data is written into the buffer memory.

On the other hand, a signal processing stage clock (XCK) for error correction processing and audio output processing is switched promptly. The signal processing stage clock controls the rate at which data is read form the buffer memory. As a result, within a transitional period of the disc motor until the rotation speed reaches the required speed, the frequency difference between the reproduction stage clock (VCOCK) and the signal processing stage clock (XCK) is relatively large.

In the buffer memory, storing (writing) is performed by a reproduction stage frame clock (PFS) synchronous with the clock VCOCK, and reading is performed by a signal processing stage frame clock (XFS) synchronous with the clock XCK which is synchronous with a clock signal generated by a crystal oscillator. For this reason, the address difference between storing and reading caused by the frequency difference exceeds an allowed value for the buffer memory. This means an overflow or underflow, i.e., emptying, which results in a reproduction interruption.

The problem mentioned above is not limited to the CD-ROM player. For example, the problem also exists for a CD player which comprises a shock proof memory to eliminate effects of data pick-up interruption caused by a shock from outside. The shock proof memory, usually a large capacity memory such as 4 MB DRAM (four megabit dynamic random access memory), is employed between the buffer memory and the DAC to store the reproduced output of the buffer memory. The reproduced output is stored to the shock proof memory, then read out. This system is called shock proof.

In the shock proof system, storing to the shock proof memory is controlled to keep a predetermined data quantity in the shock proof memory in the following manner. When storing is interrupted by a shock from outside, the reproduced data in the shock proof memory is reduced because reading-out continues. If the quantity reduction in the shock proof memory is detected, then in order to recover the predetermined quantity in the shock proof memory, a reading rate from the buffer memory is switched to a faster rate. In this case, because the rotation speed of the disc motor changes gradually, the difference between the reproduction stage clock and the signal processing stage clock is increased. As a result, an underflow occurs in the buffer memory, which causes a reproduction interruption.

As described above, in systems such as the shock proof system and CD-ROM in which the reproduction rate is switched, the reproduction can be interrupted because of overflow or underflow.

Sudden speed change also occurs, by a search operation, in a conventional CD player which does not employ the reproduction rate switching. The disc rotates in about 8 Hz when the pickup is at the inner periphery side of the disc, and 3 Hz when the pickup is at the outer periphery side so as to maintain a constant linear velocity (CLV). For this reason, to track the data in the outer periphery side when the pickup is tracking the inner periphery side, the rotation speed of the disc motor should be reduced to below one-half. In the opposite case, when the pickup is at the outer periphery side, the speed should be increased to two times greater to track the data in the inner periphery side. The frequencies of the clocks VCOCK and PFS obtained by supplying the RF circuit and the PLL circuit with the signal from the pickup, are synchronous with the disc rotation rate. For this reason, at the moment when the pickup moves to a target point, for example from the inner periphery side to the outer periphery side, the frequencies of the clocks VCOCK and PFS are higher than their predetermined value for the target point until the disc motor decreases its speed to the predetermined speed. When the pickup moves from the outer periphery side to the inner periphery side, the frequencies of the clocks VCOCK and PFS are lower than their predetermined value for the target point. These cases can result in underflow or overflow, by the frequency difference between the clocks PFS and XFS, which results in the reproduction interruption. Particularly, in the system in which high-speed access is required, a long muting period until the reproduction is restarted is one of the serious problems.

To solve the above problems, although using high-controllability motors which have a shortened transitional period can be effective, these motors are expensive and consume greater electric power. Use of these motors results in an increased price of the CD player set and decreases the marketability of the CD player set.

In the field of disc data reproduction systems, a disc data reproduction apparatus which uses a clock generated by a PLL (Phase Locked Loop) circuit is suggested. Such a reproduction apparatus is, for example, disclosed in the Japanese Patent Laid Open (Ko-kai) 93-28632. In the reproduction apparatus (player) disclosed in the above laid-open patent, a disc is rotated at a constant angular velocity (so-called, CAV) by a spindle motor. The CAV rotation of the disc means that the linear velocity of the tracking changes according to the rotation radius and data transfer rates are not constant. For example, under constant angular velocity, when the data transfer rate represents four times the normal rate at the outer periphery side, the data transfer rate represents 1.6 times the normal rate at the inner periphery side.

To implement the above mentioned CAV player, a calculation circuit which calculates a reference frequency for the PLL circuit and a frequency synthesizer which controls the frequency are required. The calculation is executed according to the address information and optical pickup position information detected by a position sensor. Further, for the usual audio use such as music reproduction, a CAV player must employ other circuits to perform CLV reproduction. As a result, disc data reproduction using a CAV system has a complex structure and increases the price of the player set.

SUMMARY OF THE INVENTION

Accordingly, it is an object of the present invention to provide an improved disc player wherein reproduction interruptions, or muting caused by reproduction speed switching are reduced.

It is another object of the present invention to provide an improved signal processing circuit and a reproduction method for reducing interruptions of the reproduction caused by reproduction speed switching and search operation.

It is further object of the present invention to provide disc players in which access time deviation is minimized.

In accordance with the present invention, the foregoing objects, among others, are achieved by providing an apparatus for reproducing data stored on a disc, comprising means for rotating the disc, pickup means for reading out data from the disc during rotation thereof, means for generating a digitized signal by quantizing the read out disc data in accordance with rotation of the disc, means for generating a first clock in response to the digitized signal, means for demodulating the digitized signal in response to the first clock and for outputting demodulated data, means for storing the demodulated data, means for deriving a second clock from the first clock and for outputting the second clock as a reference clock, and memory controlling means for controlling a writing operation to the storing means in response to the first clock and for controlling a reading operation from the storing means in response to the reference clock.

In accordance with another aspect of the present invention, the above-stated objects are achieved by providing an apparatus for reproducing data stored on a disc, comprising means for rotating the disc, pickup means for reading out data from the disc during rotation thereof, means for generating a digitized signal by quantizing the read out disc data in accordance with rotation of the disc, means for generating a first clock in response to the digitized signal, means for demodulating the digitized signal in response to the first clock and for outputting demodulated data, means for storing the demodulated data, means for deriving a second clock from the first clock and for outputting the second clock, means for supplying a constant clock at a predetermined frequency, means for selecting one of the second clock and the constant clock and for outputting the selected clock as a reference clock,. and memory controlling means for controlling a writing operation to the storing means in response to the first clock and for controlling a reading operation from the storing means in response to-the reference clock.

In accordance with further aspect of the present invention, the above-stated objects are achieved by providing an apparatus for reproducing a plurality of data stored on a disc, the plurality of disc data capable of being classified into at least a first type data and a second type data, the apparatus comprising, means for designating information data to be read among the plurality of disc data and for designating one of the first and second types of data, a disc motor for rotating the disc, a pickup for reading disc data designated by the designating means, a first clock generator to generate a first clock responsive to the disc data read from the disc, a second clock deriving circuit for deriving a second clock from the first clock, an oscillator for supplying a constant clock at a predetermined frequency, a selector for selecting one of the second clock and the constant clock and for outputting the selected clock as a reference clock, a first divider for dividing the first clock to generate a first frame clock, and a second divider for dividing the reference clock to generate a second frame clock, a buffer memory for storing disc data read from the disc, and memory controlling means for controlling a writing operation to the buffer memory in response to the first frame clock and for controlling a reading operation from the buffer memory in response to the second frame clock, wherein, when the designated disc data is the first type data, the selector selects the second clock as the reference clock, and when the designated disc data is the second type data, the selector selects the constant clock as-the reference clock.

A signal processing circuit derived from the present invention for use in processing data read from a rotating disc for storage in a buffer memory comprises a first clock generating circuit to generate a first clock responsive to an EFM signal generated by quantizing the data read from the rotating disc, a demodulator to demodulate the EFM signal in response to the first clock and to output demodulated data, a second clock deriving circuit to derive a second clock from the first clock and to output the second clock as a reference clock, and a memory controlling circuit to control writing of the demodulated data to the buffer memory in response to the first clock and for controlling reading of the demodulated data from the buffer memory in response to the reference clock.

Further, a signal processing circuit for use in processing data read from a rotating disc for storage in a buffer memory, derived from the present invention comprises a first clock generating circuit to generate a first clock responsive to an EFM signal generated by quantizing the data read from the rotating disc, a demodulator to demodulate the EFM signal in response to the first clock and to output demodulated data a second clock deriving circuit to derive a second clock from the first clock and to output the second clock, a selector to select one of the second clock and an externally supplied constant clock at a predetermined frequency, and for outputting the selected clock as a reference clock, and a memory controlling circuit to control writing of the demodulated data to the buffer memory in response to the first clock and for controlling reading of the demodulated data from the buffer memory in response to the reference clock.

A method for reproducing data stored on a disc, derived from the present invention comprises the steps of reading out the disc data during rotation of the disc, generating a digitized signal by quantizing the read out disc data in accordance with a rotation of the disc, generating a first clock in response to the digitized signal, demodulating the digitized signal in response to the first clock and outputting a demodulated data, deriving a second clock from the first clock and for outputting the second clock as a reference clock, and writing the demodulated data to a buffer memory in response to the first clock, and reading the demodulated data from the buffer memory in response to the reference clock.

Further, a method for reproducing data stored on a disc, derived from the present invention comprises the steps of, reading out disc data during rotation of the disc, generating a digitized signal by quantizing the read out disc data in accordance with a rotation of the disc, generating a first clock in response to the digitized signal, demodulating the digitized signal in response to the first clock and outputting a demodulated data, deriving a second clock from the first clock, and selecting one of the second clock and a constant clock at a predetermined frequency as a reference clock, writing the demodulated data to a buffer memory in response to the first clock; and reading the demodulated data from the buffer memory in response to the reference clock.

Apparatus for reproducing data stored on a disc, derived from the present invention, comprises means for rotating the disc, pickup means for reading out disc data from the disc during rotation thereof, means for generating a digitized signal by quantizing the read out disc data in accordance with rotation of the disc, means for generating a reproduction reference clock responsive to the digitized signal, means for supplying an oscillator clock at a predetermined frequency, means for demodulating the digitized signal in response to the first clock and for outputting demodulated data, means for storing the demodulated data, memory controlling means for controlling a writing operation to the storing means in response to the reproduction reference clock, means for detecting the frequency of the reproduction reference clock in accordance with the constant clock, and means for determining the demodulated data as invalid when the detected frequency is out of a predetermined range.

Another signal processing circuit, derived from the present invention, for use in processing information data read from a rotating disc, for storage in a buffer memory, comprises a clock generating circuit to generate a first clock responsive to an EFM signal generated by quantizing the information data in accordance with a disc rotation, a demodulator to demodulate the EFM signal in response to the first clock and to output demodulated data, a second clock generating circuit to generate a second clock and to output the second clock as a reference clock, and memory controlling circuit to control writing the demodulated data to the buffer memory in response to the first clock and to control reading the demodulated data from the buffer memory in response to the reference clock, a second detector to detect a frequency of the first reference clock in accordance with a constant clock, and a determining circuit to determine the demodulated data as invalid when the detected frequency is out of a predetermined range.

A reproduction speed detecting circuit derived from the present invention for use in processing data read from a rotating disc, the processing including generating a reproduction reference clock responsive to an EFM signal obtained by quantizing the information data, comprises a first divider for dividing the reproduction reference clock to generate a first clock, a second divider for dividing a constant clock to generate a second clock, a timing pulse generator to generate a latch pulse and a clear pulse in response to a detection of a falling edge of the second clock, a counter to count up the first clock, the counter being reset by the clear pulse, and an output circuit to output a value of the counter in response to the latch pulse.

Another method for reproducing data stored on a disc, derived from the present invention comprises reading out disc data from a rotating disc, generating a digitized signal by quantizing the read out the disc data in accordance with a rotation of the disc, generating a reproduction reference clock responsive to the digitized signal, demodulating the digitized signal in response to the reproduction reference clock, writing the demodulated data to a buffer memory in response to the reproduction reference clock, reading the demodulated data from the buffer memory in response to a read-out reference clock, detecting a frequency of the reproduction reference clock in accordance with a constant clock, and determining the demodulated data as invalid when the detected frequency is out of a predetermined range.

Other objects, features, and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

A more complete appreciation of the present invention and many of its attendant advantages will be readily obtained by reference to the following detailed description considered in connection with the accompanying drawings, in which.

Figure 2:
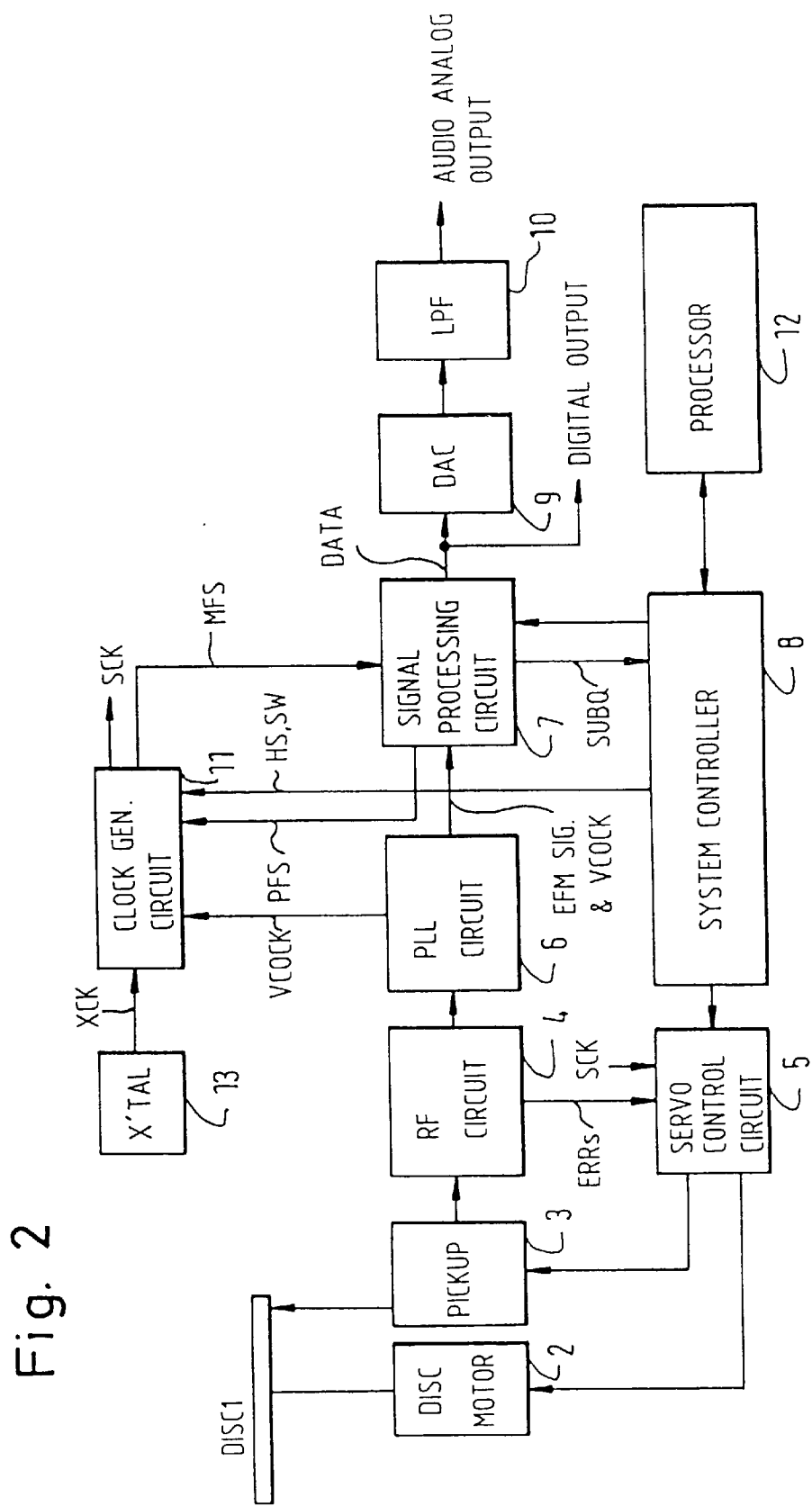
Figure 3:
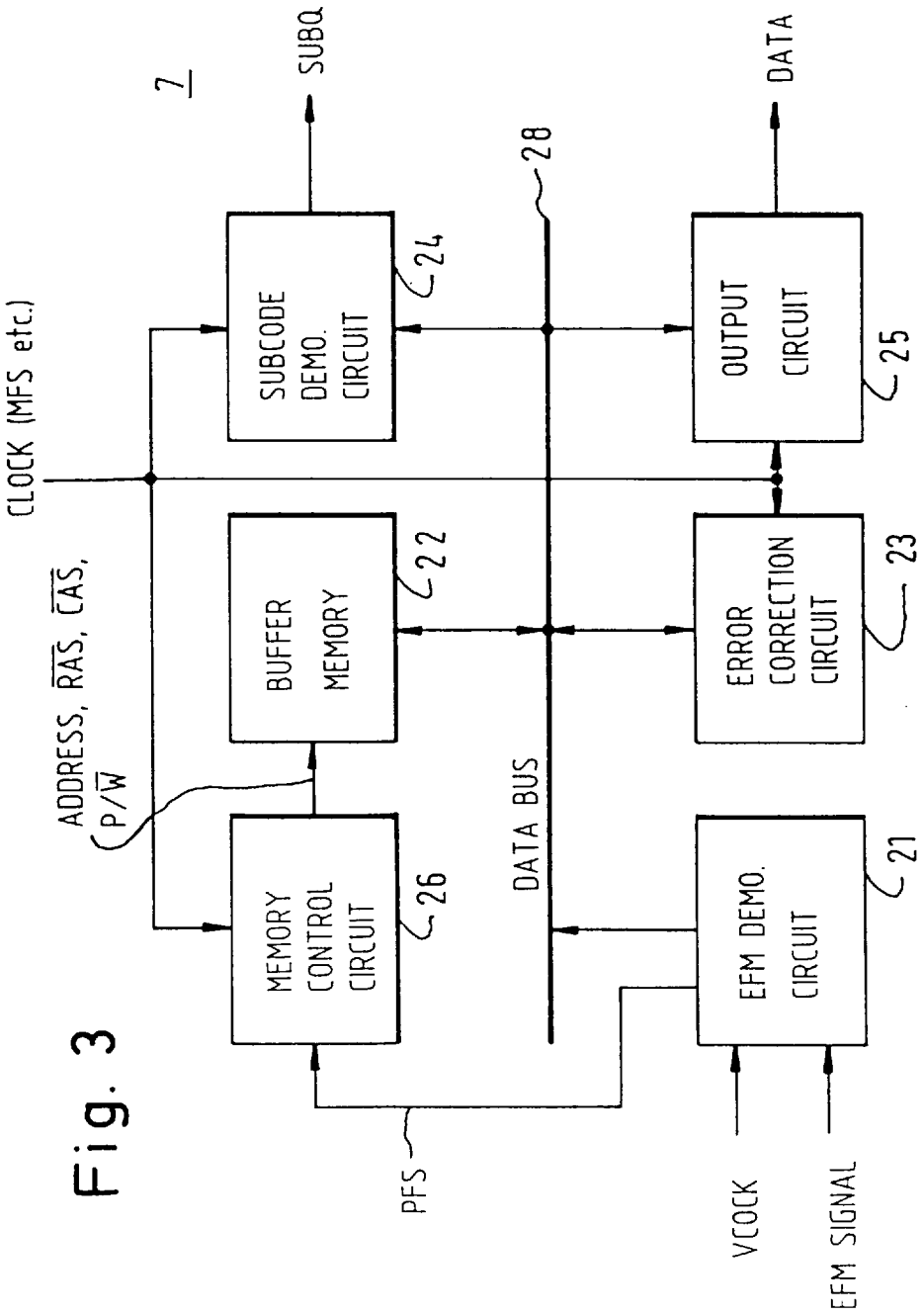
Figure 6:
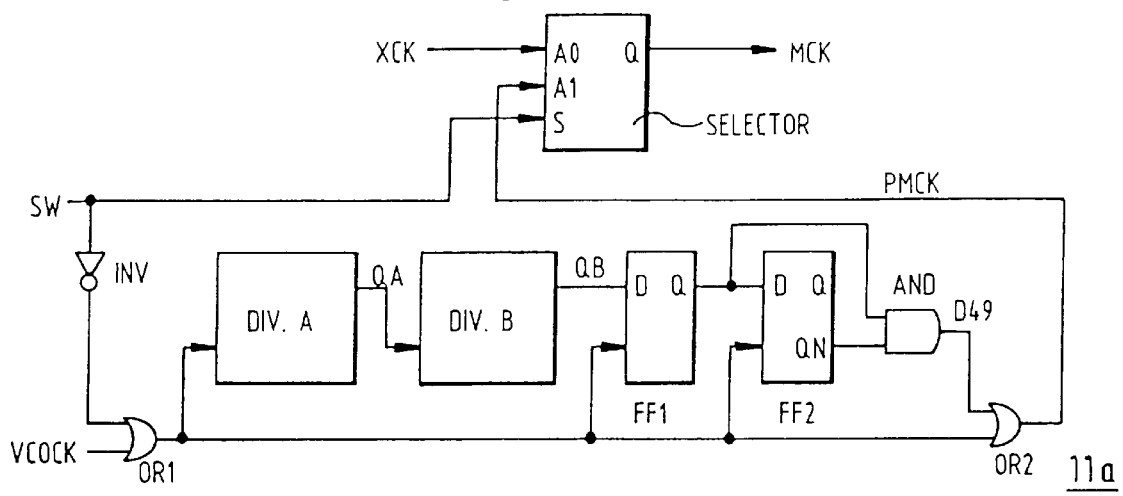
Figure 7:
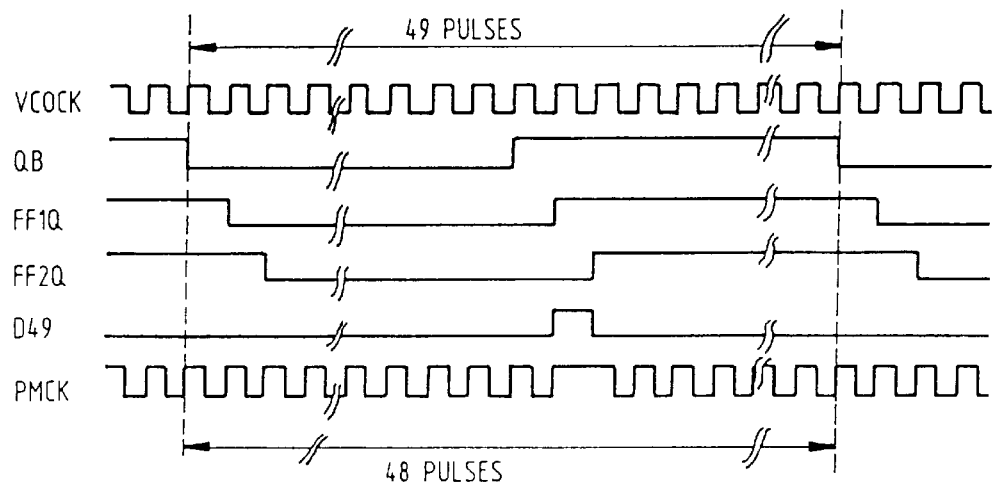
Figure 8:
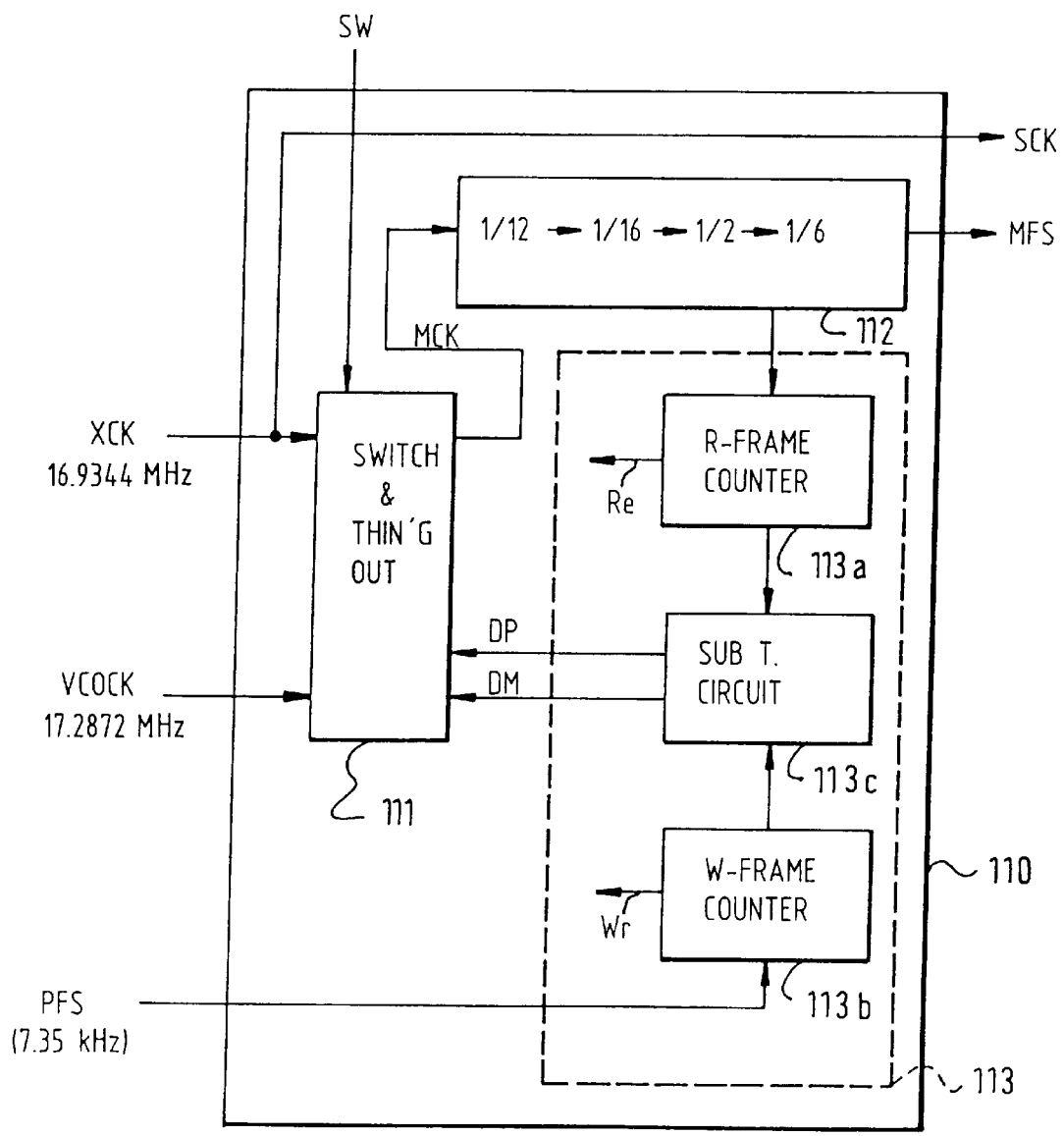
Figure 9:
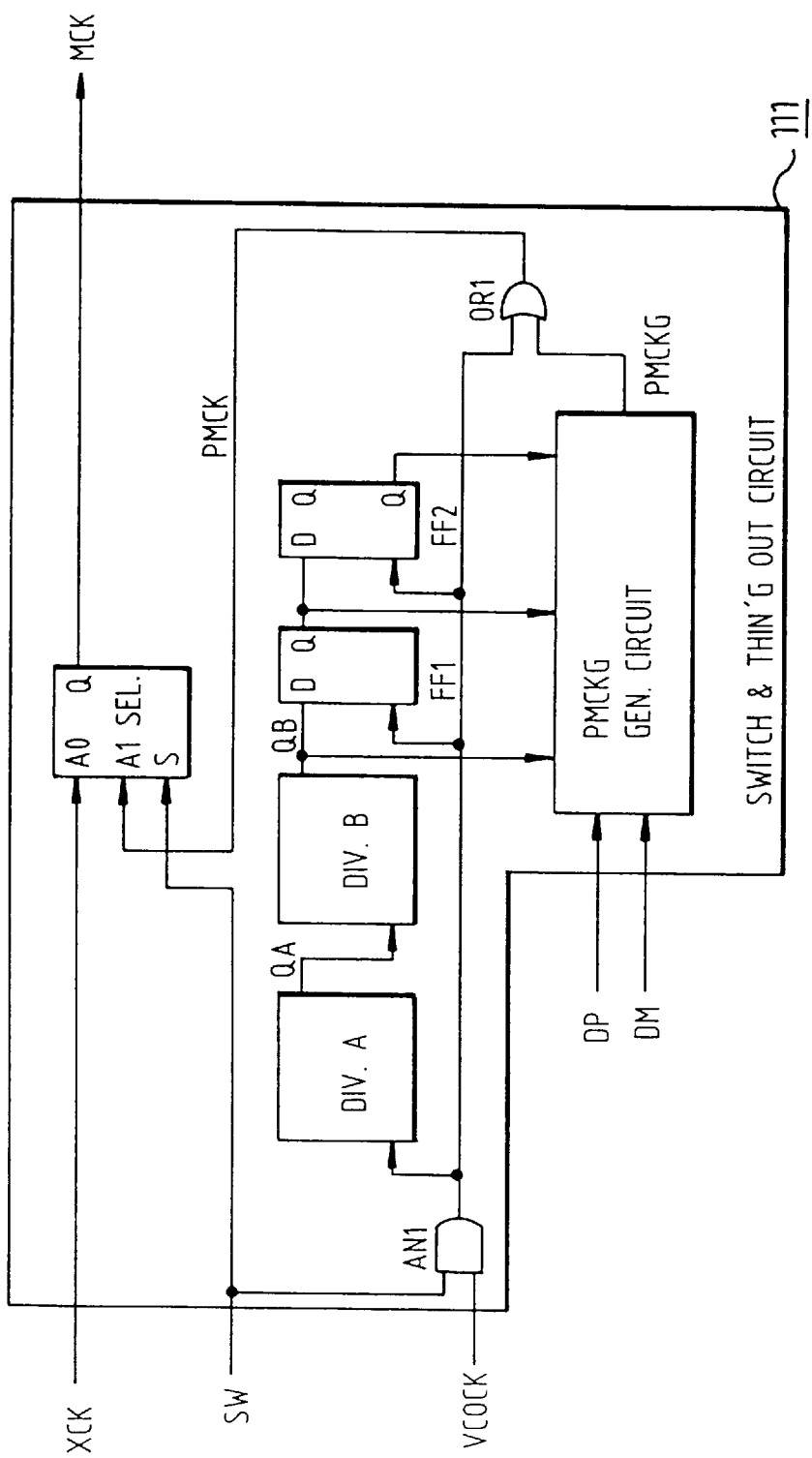
Figure 10:
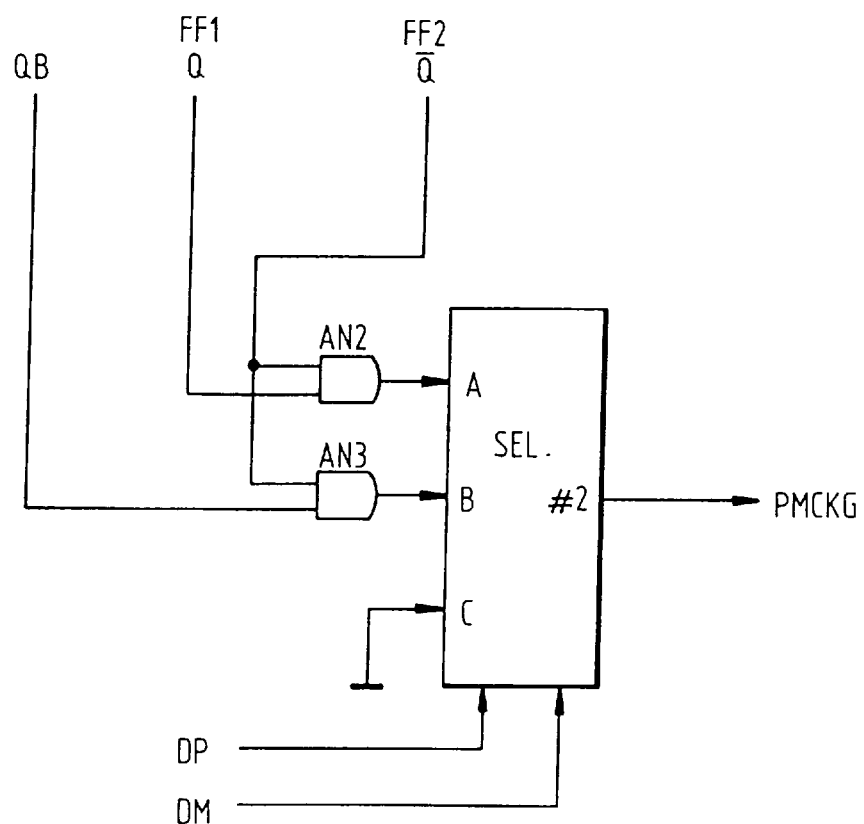
Figure 11:
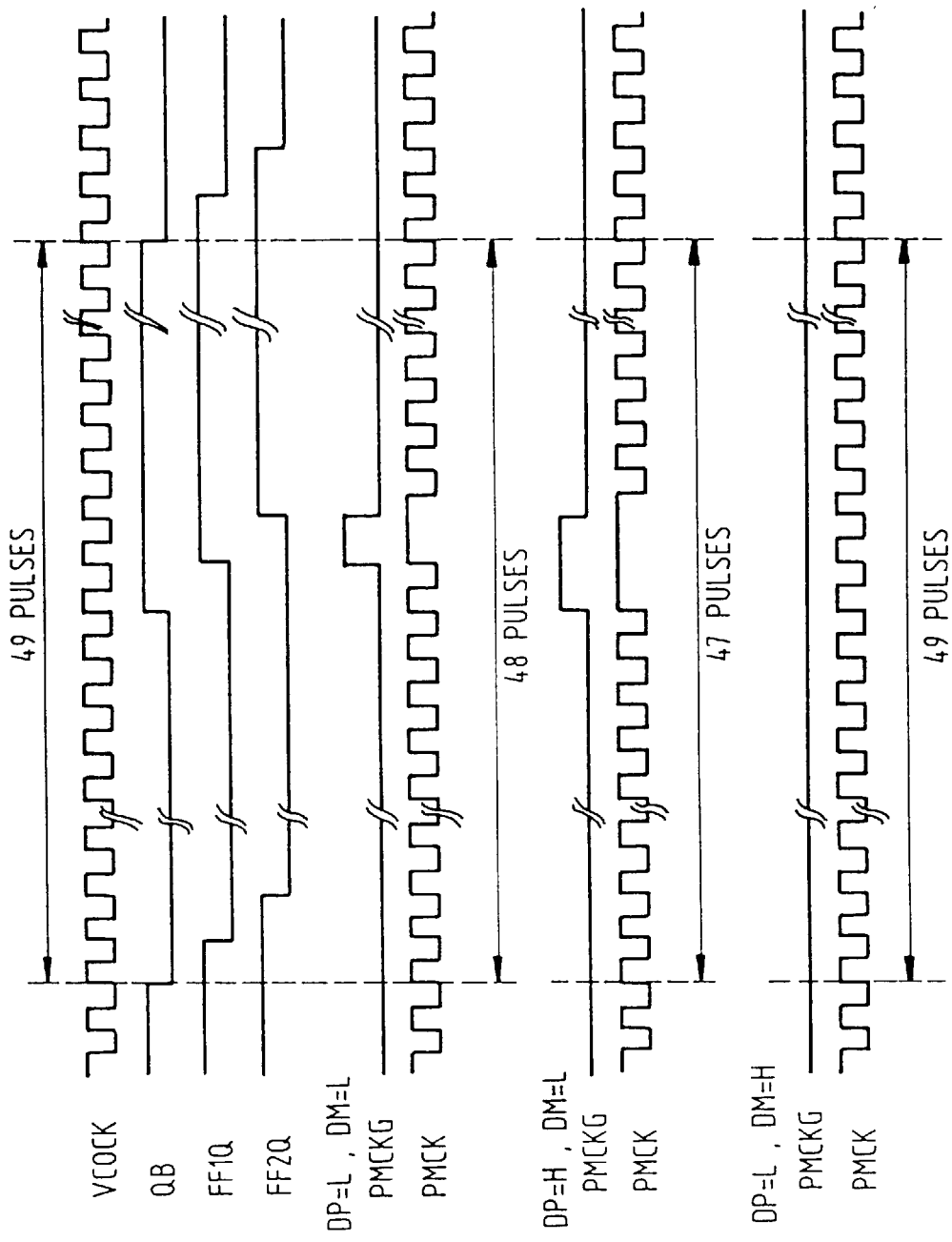
Figure 12:
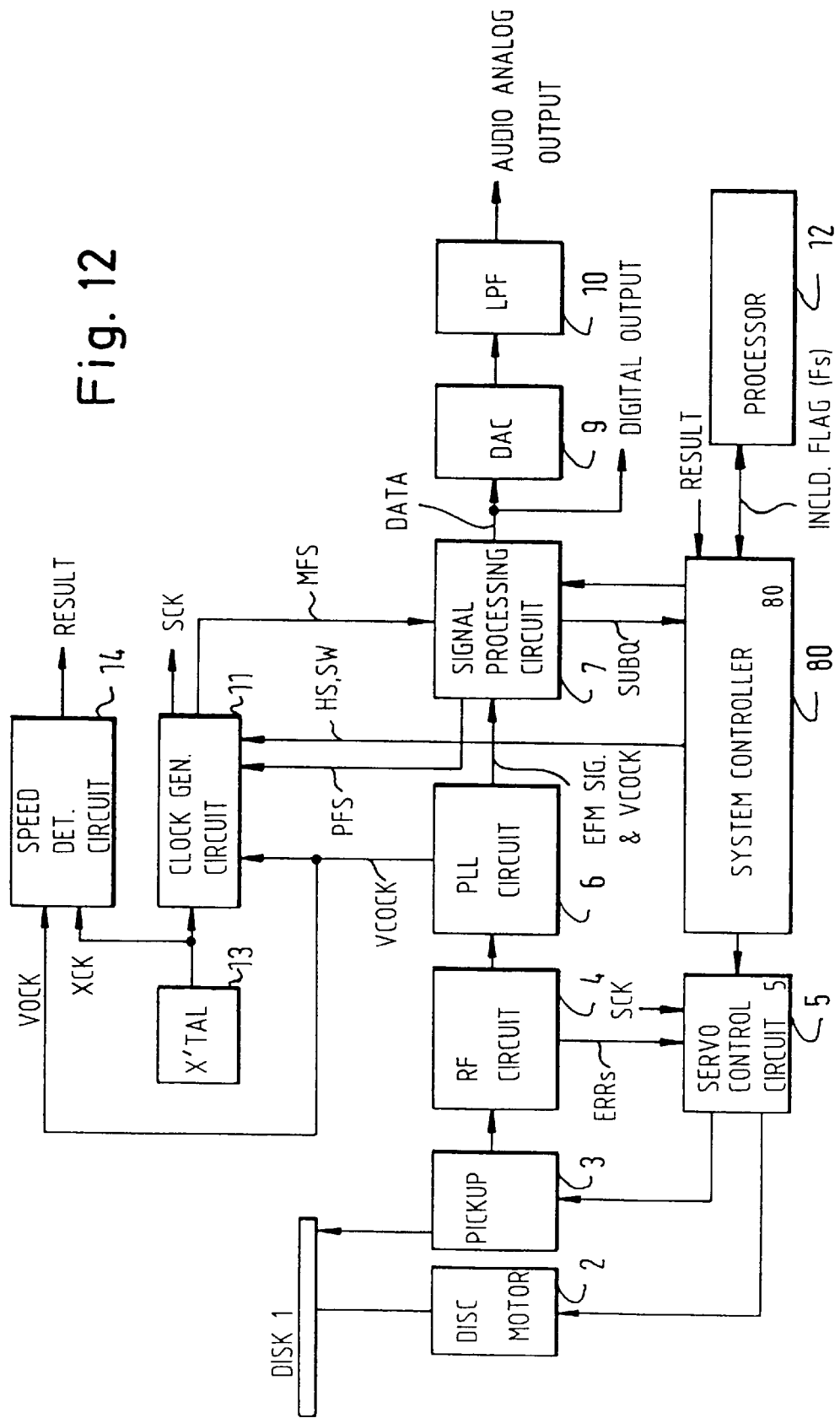
Figure 13:
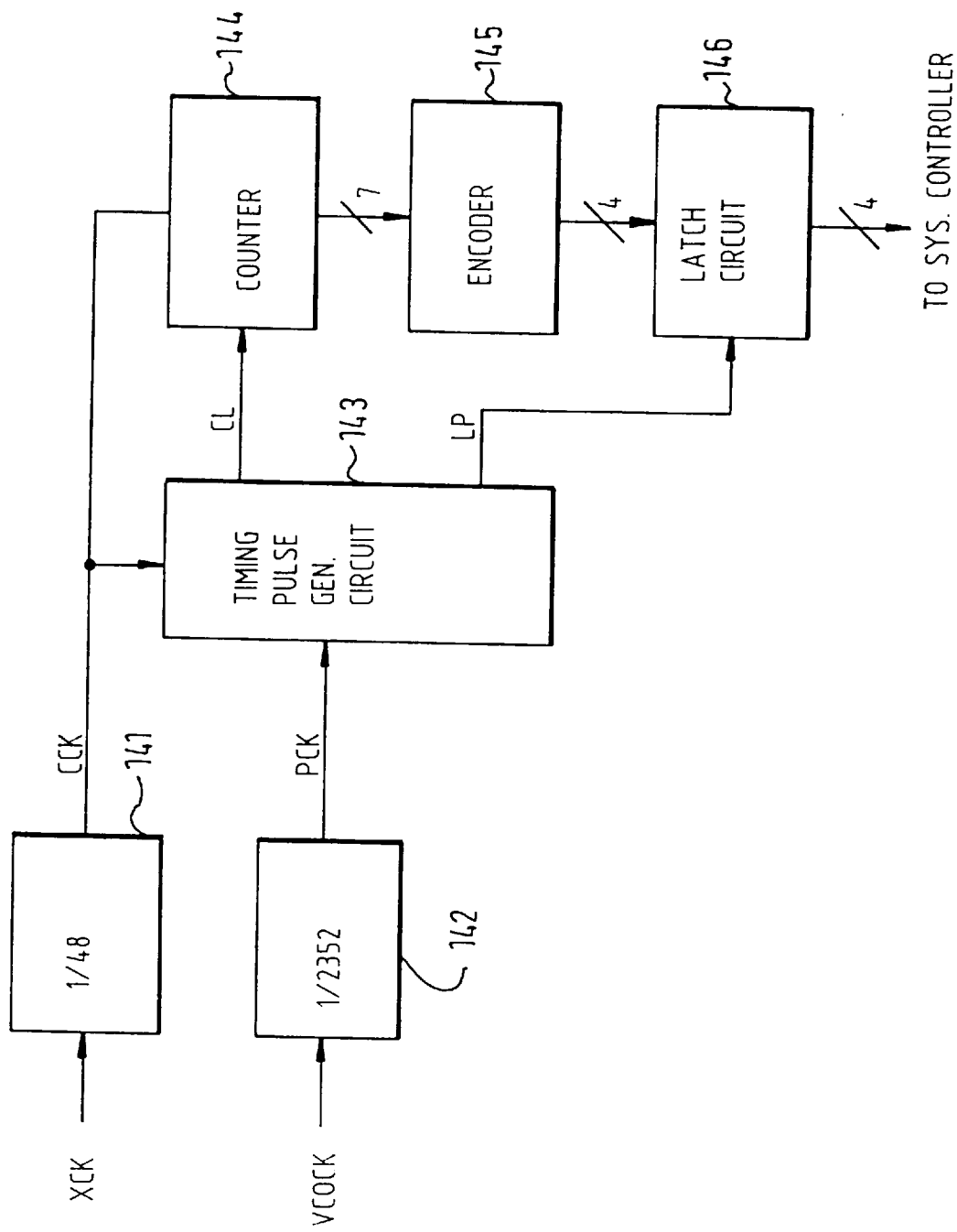
Figure 14:
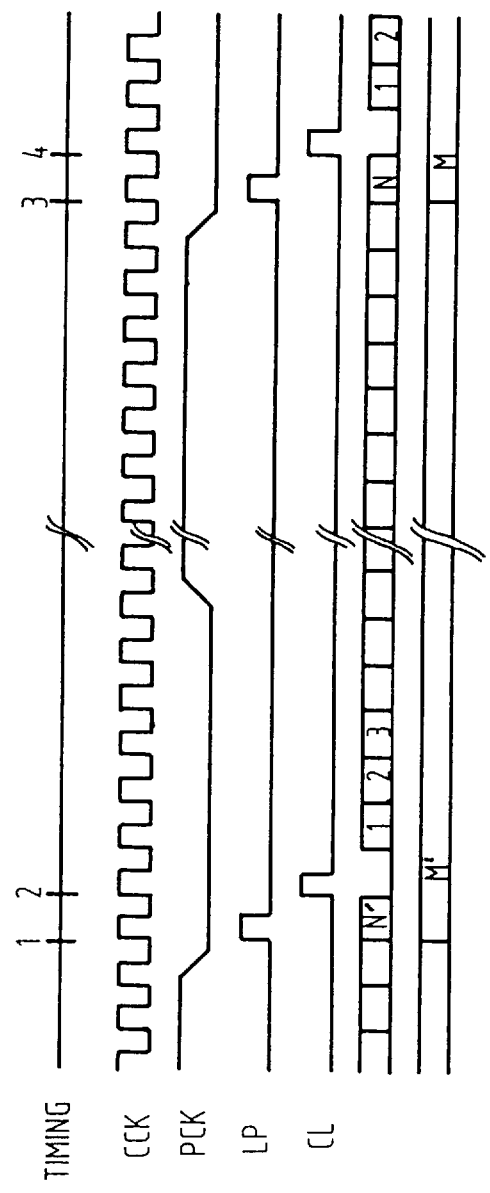

and the frequency of a signal processing stage clock ($f_{xck}$) according to a conventional system;

FIG. 2 is a block diagram of a disc data reproducing apparatus according to a first embodiment of the present invention;

FIG. 3 is a block diagram of a signal processing circuit according to the first embodiment of the present invention;

FIG. 4 is a block diagram of a part of an EFM demodulating circuit according to the first embodiment of the present invention:

FIG. 5 is a block diagram of a part of a clock generating circuit according to the first embodiment of the present invention;

FIG. 6 is a block diagram of a switching and thinning out circuit according to the first embodiment of the present invention;

FIG. 7 is a timing chart showing an operation of the thinning out circuit shown in FIG. 6;

FIG. 8 is a block diagram of a switching and thinning out circuit according to a second embodiment of the present invention;

FIG. 9 is a block diagram of a switching and thinning out circuit according to the second embodiment of the present invention;

FIG. 10 is a block diagram of a PMCKG generating circuit of the switching and thinning out circuit according to the second embodiment of the present invention;

FIG. 11 is a timing chart showing an operation of the thinning out circuit shown in FIG. 10;

FIG. 12 is a block diagram of a disc data reproducing apparatus according to a third embodiment of the present invention;

FIG. 13 is a block diagram of a reproducing speed detection circuit according to the third embodiment of the present invention;

FIG. 14 is a timing chart showing an operation of the reproducing speed detecting circuit shown in FIG. 13; and.

Figure 15:
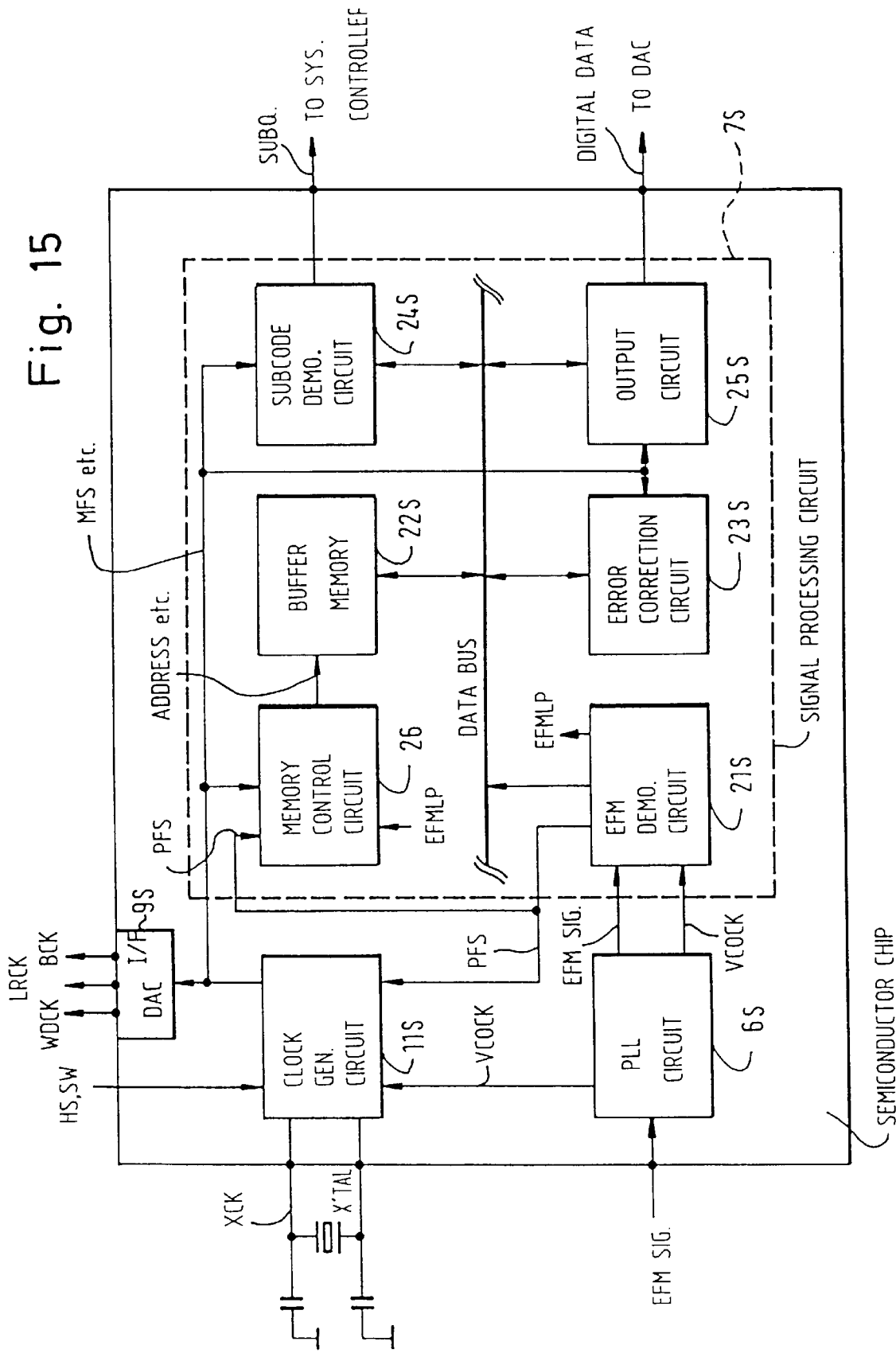

FIG. 15 is a block diagram of a signal processing circuit formed on a semiconductor chip in accordance with the present invention.

Figure 16:
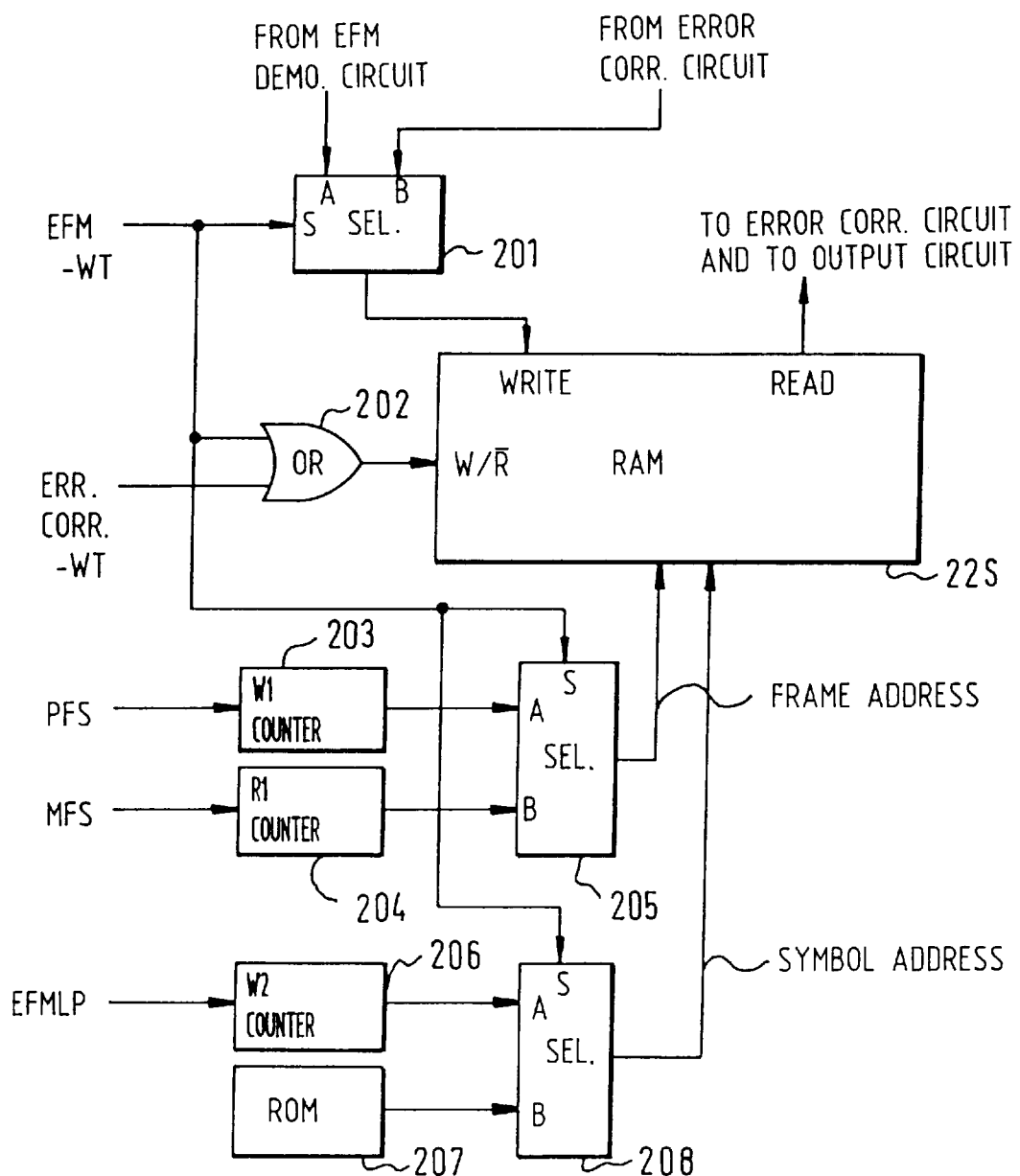

FIG. 16 is a block diagram of a memory control circuit and a buffer memory according to the present invention.

Figure 17:
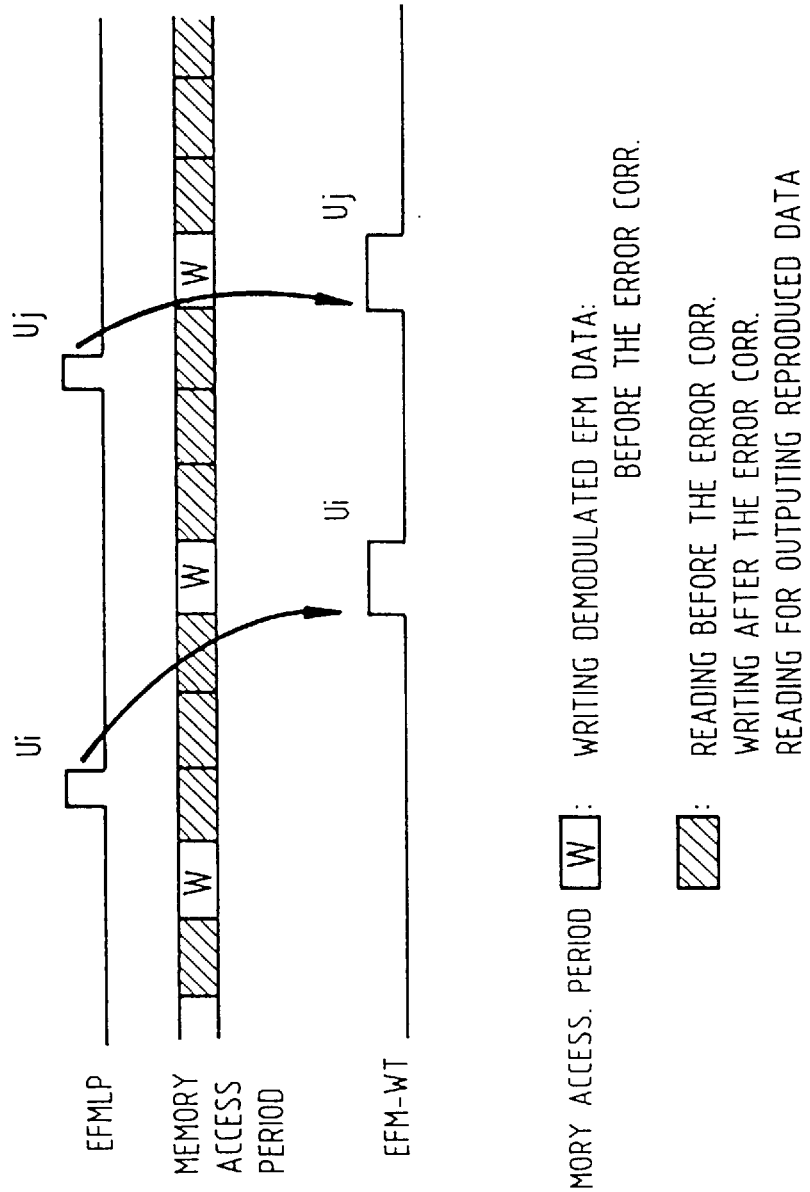

FIG. 17 is a timing chart showing generation of an EFM-WT signal in the memory control circuit according to the present invention.

DESCRIPTION OF PREFERRED EMBODIMENTS

Embodiments of the present invention will be described in detail with reference to the drawings.

Referring now to FIGS. 2–7, a first embodiment of the disc data reproducing apparatus, method and a signal processing circuit for reducing reproduction interruptions will be described in detail. In FIG. 2, a disc 1 such as a CD (compact disc) is rotated by a disc motor 2, such as a spindle motor. Recorded data on the disc 1 is read by an optical pickup 3, and the data read out is supplied to an EFM signal generation circuit (hereinafter called an RF circuit) 4. The RF circuit 4 extracts a focus error signal and a tracking error signal (hereinafter called ERRs) from an output of the optical pickup 3, and supplies these extracted signals to a servo control circuit 5. Further, the RF circuit 4 quantizes the signal read from the disc 1 and supplies a PLL circuit 6 with the quantized signal as the EFM signal. The PLL circuit 6 generates a reproducing stage reference clock (VCOCK) synchronous with the EFM signal for demodulating the EFM signal in a signal processing circuit 7. The PLL circuit 6 supplies the EFM signal and the clock VCOCK to the signal processing circuit 7. A center frequency of the clock VCOCK is 17.2872 MHz, which is four times a bit rate of the EFM signal. The bit rate of the EFM signal is 4.3218 MHz.

The servo control circuit 5 comprises a focus servo control circuit, a tracking servo circuit, a spindle servo control circuit and a sled servo control circuit. The focus servo control circuit controls an optical focus of the pickup 3 to make the focus error signal equal to zero. The tracking servo control circuit controls an optical tracking of the pickup 3 to make the tracking error signal equal to zero. The spindle servo control circuit controls the disc motor 2, which drives the disc 1 at a predetermined speed, or a constant linear velocity (CLV). The sled servo control circuit moves the pick up 3 to a target track point for adjusting an actuator position of the tracking servo to a center position of its allowable moving range.

The signal processing circuit 7 performs an EFM demodulation, a subcode demodulation and an error correction processing. The output of the circuit 7 is supplied to a D/A (digital/analog) converter (hereinafter called DAC) 9. An output of the DAC 9 is supplied to a low pass filter (LPF) 10, and an output of the LPF 10 corresponds to a reproduced audio output signal. The ROM data, such as video information and character codes, is output from the signal processing circuit 7 as ROM data output (digital output) without processing by the DAC 9 and the LPF 10.

A system controller 8 supplies a clock generating circuit 11 with control signals including a rate control signal (HS) and a clock switching signal (SW). The system controller 8 also supplies the signal processing circuit 7 and the servo control circuit 5 with many other control signals for play, stop, search, attenuating, etc.

The system controller 8 generates the signals HS and SW on the basis of control signals from a processor 12, which controls the whole system of the CD player. Information about the contents of the disc is obtained by reading TOC (Table of Contents) data on a lead-in area (radius 23 mm to 25 mm) on the disc. From TOC data, respective positions, or start addresses, of the audio data and ROM data (such as image data and character codes) are obtained. Besides TOC data, the type of the reproduction data, i.e., audio data or not, is determined by using a subcode-Q data which is demodulated by a subcode demodulating circuit 24 (FIG. 3). The processor 12 controls the system controller 8 to generate the signals HS and SW in accordance with the required (designated) data. When the designated data is the audio data, the signal SW of "L" level is generated to prevent a signal processing stage reference clock from being switched. On the other hand, when the designated signal is the ROM data, the signal SW of "H" level is generated.

The clock generating circuit 11, according to the signals HS and SW, generates the signal processing stage reference clock (MCK) from a crystal oscillator clock (XCK) or the reproduction stage reference clock (VCOCK). The crystal oscillator clock is supplied from a crystal oscillator (X'tal) 13. The reproduction stage reference clock (VCOCK) is a PLL clock generated by the PLL circuit 6. Subsequently, the clock generating circuit 11 divides the clock MCK by 2304 to generate a signal processing stage frame clock (MFS), which is used as a reading frame clock for a buffer memory in the signal processing circuit 7. The clock generating circuit 11 outputs the clock XCK as a servo control reference clock (SCK).

The signal processing circuit 7 will be described in detail with reference to FIG. 3. The signal processing circuit 7 of this embodiment comprises an EFM demodulating circuit 21, a buffer memory 22, an error correction circuit 23, a subcode demodulating circuit 24, an output circuit 25 and a memory control circuit 26. The EFM demodulating circuit 21 receives the reproducing stage reference clock (VCOCK) which is generated by the PLL circuit 6 and is synchronous with the EFM signal. After extracting a synchronizing signal, i.e., sync pattern, the EFM signal is demodulated and stored into the buffer memory 22 via a data bus 28 as 33-symbol data, per one frame, which consists of 1-symbol subcode data and 32-symbol main data including parity data.

The buffer memory 22 is used for jitter absorption and an interleaving in the error correction process. The jitter on the time axis is absorbed, or eliminated by writing the EFM demodulated signal to the buffer memory 22, in synchronism with the reproduction stage frame clock (PFS) and by reading in synchronism with the signal processing stage frame clock (MFS) which is generated by the clock generating circuit 11. An output of the buffer memory 22 is supplied, via the data bus 28, to the error correction circuit 23, in which C1 and C2 system error corrections are performed. Such C1 and C2 system error corrections are disclosed in "Principles of Digital Audio" (ISBN:0-672-22388-0) Chap. 6, Sec. 6.3 (Error Correction). Ken C. Pohlmann (1987). The error corrected data is again stored to the buffer memory 22 in synchronism with the clock MFS. Subsequently, the error corrected data is read from the buffer memory 22 in synchronism with the clock MFS, and supplied to the output circuit 25. The output circuit 25 outputs reproduced data (DATA) after, if uncorrectable data exists, mean value interpolation and mute functions are performed. The subcode demodulating circuit 24 reads out subcode data from the buffer memory 22, performs an error check of Q data (one component of the subcode), and outputs the result (SUBQ) to the system controller 8. It is preferable to read subcode data with the C1 system error correction. Here, the subcode data is stored to and read from the buffer memory. However, some reproduction systems demodulate the subcode data without using the buffer memory for subcode processing.

The memory control circuit 26 outputs control signals such as a row address signal, a column address signal, a row address strobe signal (/RAS). a column address strobe signal (/CAS) and a read/write signal (R/W) to the buffer memory 22. On detecting falling edges of the signals /RAS and /CAS, the buffer memory 22, such as a 16 k-bit DRAM, latches the row address and column address signals, respectively. In this case, the address to be supplied to the buffer memory 22 is classified into one of the following four kinds. These addresses are a Wr address for writing the demodulated EFM data in the buffer memory 22, a C1 address for reading C1 system data to detect an error of the C1 system from the data written in the buffer memory 22 and for writing in and reading from the buffer memory 22 to correct the detected erroneous data, a C2 address for reading C2 system data to detect an error of the C2 system from the data written in the buffer memory 22 and for writing in and reading from the buffer memory 22 to correct the detected erroneous data, and an Re address for reading the data from the buffer memory 22 to output to the DAC 9. If the buffer memory is formed on a single chip with memory control circuit, the buffer memory can be controlled without using /RAS and /CAS.

The memory control circuit 26 has an address circuit (not shown in the drawings) including two counters. One of the counters counts up the reproduction stage frame clock (PFS) generated on the basis of a frame synchronizing signal of the EFM data read from the disc 1, and generates the frame address of Wr. As a result, jitter occurs during the write-in processing of the demodulated EFM data into the buffer memory. The other counts the signal processing stage frame clock (MFS), and generate the frame address of C1, C2, and Re. As described above, while writing of the demodulated EFM data is performed using Wr address in synchronism with the clock PFS, the reading is performed using the Re address in synchronism with the clock MFS.

When the clock switching signal (SW) represents "L" (low level), the crystal oscillator clock (XCK) is used to derive the signal processing stage reference clock (MCK). As a result, write and read operations absorbs the jitter on the time axis. When the signal SW represents "H" (high level), the reproduction stage reference clock (VCOCK) is used to derive the clock MCK. As a result, the jitter is never absorbed, and the underflow and overflow are prevented in the buffer memory 22. In the latter case, the jitter in the output data signals does not cause a problem, because the output data signals from the signal processing circuit 7 are not output directly as audio signals in the systems such as CD-ROM and the shock-proof system.

FIG. 4 is a block diagram showing a part of the EFM demodulating circuit 21. A circuit 21a in the EFM demodulating circuit 21 reads the EFM signal in synchronism with a channel clock (PLLCK, 4.3218 MHz) which is derived from the clock VCOCK via a divide-by-4 circuit 21b. This circuit 21a extracts a synchronizing signal, i.e., sync pattern, and performs protection processing on the extracted synchronizing signal. In the circuit 21a, the reproduction stage frame clock (PFS), i.e., writing frame clock, is generated in accordance with the extracting of the sync pattern. Therefore, a frequency of the clock PFS depends on extracting of the synchronizing signal, i.e., sync pattern. If the sync pattern is detected correctly, one sync pattern is detected in every one frame, i.e., every 588 bits of the clock PLLCK. Under such conditions, the generation of the clock PFS corresponds to dividing the channel clock PLLCK by 588. Further, the circuit 21a outputs the EFM signal without the synchronizing signal to an EFM demodulator 21c. The protection processing on the extracted synchronizing signal is for reducing errors in the case of missing the synchronizing signal and deviation among synchronizing cycles caused by a scratch on a disc. This processing is disclosed in Japanese laid open patent publications 83-219828, 83-220227 and U.S. Pat. No. 4,453,260.

Description about clocks will be provided in more detail. The crystal oscillator (X'tal) 13 generates a crystal oscillator clock (XCK) at the frequency of 16.9344 MHz which is 384 times greater than a sampling frequency 44.1 kHz. The crystal oscillator clock (XCK) is divided by 2304 to generate a crystal oscillator frame clock (XFS) having a frequency of 7.35 kHz. In contrast, the reproduction stage reference clock (VCOCK) is a PLL clock generated by the PLL circuit 6 according to the EFM signal, and its center frequency is 17.2872 MHz. For this reason, if the signal processing stage frame clock (MFS) is generated by dividing the clock VCOCK by 2304, a difference between the clocks XFS and MFS occurs. To prevent the difference from occurring, a clock PMCK derived from the clock VCOCK is used as the signal processing stage reference clock (MCK). Because a rate of the clock XCK to the clock VCOCK is 48/49, the clock PMCK can be obtained by thinning out a pulse at the rate of one bit in 49 bits of the clock VCOCK. The clock PMCK produced by thinning out, as the signal processing stage reference clock (MCK) is divided by 2304 (=48×48) to generate a clock PFS', which has a same center frequency with the reproduction stage frame clock (PFS), i.e., 7.35 kHz.

A part of the clock generating circuit 11 will be described in detail with reference to FIG. 5.

The clocks XCK (16.9344 MHz) and VCOCK (17.2872 MHz) are supplied to a switching and thinning out circuit 11a in the clock generating circuit 11. The switching and thinning out circuit 11a has a function of selecting one of the clocks XCK and VCOCK according to the clock switching signal (SW), and a function of thinning out a pulse from the clock VCOCK. An output clock, as the signal processing stage reference clock (MCK), of the switching and thinning out circuit 11a is supplied to a dividing circuit 11b, which consists of a divide-by-12 circuit, a divide-by-16 circuit, a divide-by-2 circuit and a divide-by-6 circuit connected in series. Outputs (BCK, WDCK and LRCK) of these dividing circuits are supplied to a DAC interface circuit (not shown) for digital-to-analog converting. The circuit 11a is provided as a preceding stage of the circuit 11b, because outputs of the each dividing circuit are used to execute signal processing, such as the digital-to-analog converting, other than accessing the buffer memory. The clock XCK is always output to the servo control circuit 5 as the clock SCK independent of the clock switching signal (SW).

The switching and thinning out circuit 11a will be described in detail with reference to FIG. 6, and an operation of the circuit 11a will be shown by a timing chart in FIG. 7.

The circuit 11a includes a selector and logic circuits, which include an inverter (INV), two divide-by-7 circuits (DIV.A and DIV.B), two flip-flops (FF1 and FF2), an AND gate and two OR gates (OR1 and OR2). The clock VCOCK generated by the PLL circuit 6 is supplied to one input of the first OR gate (OR1). The clock switching signal (SW) from the system controller 8 is supplied to the other input of the gate OR1 via the inverter (INV). An output signal of the gate OR1 is supplied to the first divide-by-7 circuit (DIV.A), clock inputs of flip-flops (FF1 and FF2) and one input of the second OR gate (OR2). The flip-flops (FF1 and FF2) form a shift register. An output signal (QA) of the first divide-by-7 circuit is input to the second divide-by-7 circuit (DIV.B), whose output signal (QB) is supplied to the-first flip-flop (FF1). An output signal of the first flip-flop (FF1) is supplied to the second flip-flop (FF2) and one input of the AND gate (AND). To the other input of the AND gate (AND), an inverted output (QN) of the second flip-flop (FF2) is input. An output signal (D49) of the AND gate (AND) is supplied to the other input of the second OR gate (OR2), whose output is the clock PMCK. The selector has a first input (A0) to which the clock XCK is input, a second input (A1) to which the clock PMCK is input, and a control input (S) to which the signal SW is input. An output signal of the selector serves as the signal processing stage reference clock (MCK). The selector selects the first input (A0) for "L" as the switching signal (SW), and selects the second input (A1) for "H".

FIG. 7 is a timing chart for "H" as the switching signal (SW) to explain generation of the clock PMCK.

Because the signal SW is "H", the output of the gate OR1 is identical to the clock VCOCK, whose divided-by-49 signal is the output signal (QB) of the second divide-by-7 circuit. Thinning out a pulse of the clock VCOCK is performed by executing logical addition between the clock VCOCK and the output signal D49, which is obtained by executing logical multiplication between the signal FF1Q and an inverted signal of the signal FF2Q (,i.e., QN) The thinned out clock PMCK has 48 bits in a period defined by 49 bits of the clock VCOCK. In the case the signal SW is "L", the output of the gate OR1 always represents "H". As a result, the divide-by-7 circuits (DIV.A and DIV.B) and the flip-flops (FF1 and FF2) do not work, and low power consumption is established. The servo control reference clock (SCK) is independent of the clock switching signal (SW), and is always identical to the crystal oscillator clock (XCK). For this reason, controls of the disc motor 2 and pickup 3 are never affected by clock switching. When the signal SW changes from "L" to "H", an address of a jitter absorption area in the buffer memory 22 is set to a center address.

Further, the clock generating circuit 11, the servo control circuit 5 and the system controller 8 can be formed on a single semiconductor chip.

Kinds of clocks used in the disc data reproducing apparatus, method and the signal processing circuit in the first embodiment are shown in the following Table 1. Clocks used in a conventional system are the same as in the case the signal SW is "L". This means that the writing frame clock (PFS) is generated in accordance with the clock VCOCK without thinning, and the crystal oscillator frame clock (XFS) is used as the reading frame clock, or the signal processing stage frame clock (MFS). In the case the signal SW is "H". the clock PFS is used as the writing frame clock, and the clock PFS' derived from the clock PMCK, which is obtained by thinning out the clock VCOCK, is used as the reading frame clock (MFS).

TABLE 1

Clocks Used in the first embodiment

| types of clock | clock switching signal (SW) | |
| --- | --- | --- |
| | SW = "L" | SW = "H" |
| signal processing stage reference clock (MCK) | XCK | PMCK |
| reading frame clock (MFS) (signal processing stage frame clock) | XFS | PFS' |
| reproduction stage reference clock (VCOCK) | VCOCK | VCOCK |
| writing frame clock (PFS) (reproduction stage frame clock) | PFS | PFS |
| servo control reference clock (SCK) | XCK | XCK |

XCK: crystal oscillator reference clock
PMCK: clock by thinning out a pulse from VCOCK
XFS: crystal oscillator frame clock (XCK/2304)
PFS': frame clock by dividing PMCK (PMCK/2304)
VCOCK: PLL generated clock derived from EFM signal
PFS: frame clock by dividing VCOCK (VCOCK/2352)

In the first embodiment described above, when the signal SW represents "L", reading out from the buffer memory is performed in accordance with the frame clock XFS derived from a stable crystal oscillator clock, which is generated by the crystal oscillator. In the system in which jitter in the output ROM data is allowed. When the signal SW represents "H", reading from the buffer memory can always be performed using the clock PFS', and is enabled by the selector. More generally, if the system will only process output ROM data, then the selector is not required.

Generally, it is difficult to form the crystal oscillator with other circuits on a single semiconductor chip. Therefore, the crystal oscillator is provided separately from the semiconductor chip on which one or both of circuit 5 and controller 9 are formed.

By employing the system described above, data transfer rate is maintained constant and the reproduction interruptions caused by underflow or overflow are reduced.

In the system of the above first embodiment, when the synchronizing signal is extracted correctly, the clock PFS generated in the EFM demodulating circuit 21 corresponds to a divide-by-588 clock signal of the PLLCK which is a divide-by-4 clock signal of the clock VCOCK. Therefore, in the case the frequency of the clock VCOCK is 17.2872 MHz, that of the clock PFS is 7.35 kHz. Another frame clock MFS for reading-out from the buffer memory is generated by dividing the signal processing stage reference clock (MCK) by 2304. When the signal SW represents "H", the clock MCK is the clock PMCK which is derived from the clock VCOCK. Because the clock PMCK is derived by thinning out a pulse at the rate of one bit in 49 bits of the clock VCOCK, the frequency of the divided-by-2304 (48×48) clock signal of the clock PMCK corresponds to that of the divided-by-2352 (49×48) clock signal of the clock VCOCK. For this reason, the frequencies of the clocks PFS and MFS are the same value, and underflow or overflow will not occur.

However, there is a possibility that the synchronizing signal is not detected correctly. This case can occur by missing of the synchronizing signal due to a scratch of the disc or by unusual generation of the synchronizing signal due to search operations. As a result, the reproduction stage frame clock PFS is likely to represent an unusual frequency. Under such a condition, because a single frame may be longer or shorter than a period determined by 588 bits of the clock PLLCK, the frequency of the clock PFS does not corresponds to that of a divided-by-2352 clock signal of the clock VCOCK. For this reason, a difference in speed between writing and reading occurs, and underflow or overflow results in buffer memory.

As described above, the frequency of the clock PFS depends on the detection of the synchronizing signal, and this may results in overflow or underflow.

Second embodiment of the present invention relates to further improvement of the data reproduction.

The second embodiment of the disc data reproducing apparatus, method and a signal processing circuit to further refine the operation of the first embodiment will be described in detail with reference to FIGS. 8–11. Because circuits except for the clock generating circuit have the same construction as in the previous embodiment, only the clock generating circuit will be described.

In accordance with the second embodiment, a clock generation circuit 110 shown in FIG. 8, which is used in place of circuit 11 in FIG. 2, comprises a switching and thinning out circuit 111, dividing circuits 112 and a control circuit 113. The clocks XCK (16.9344 MHz) and VCOCK (17.2872 MHz) are supplied to the switching and thinning out circuit 111. The switching and thinning out circuit 111 has a function of selecting a clock from the clocks XCK and VCOCK according to the clock switching signal (SW), and a function of thinning-out a pulse or pulses from the clock VCOCK according to control signals (DP and DM). An output clock, as the signal processing stage reference clock (MCK), of the switching and thinning out circuit 111 is supplied to dividing circuits 112, which consists of a divide-by-12 circuit, a divide-by-16 circuit, a divide-by-2 circuit and a divide-by-6 circuit connected in series. The circuit 111 is provided as preceding stage of the circuit 112, because outputs of the each dividing circuit are used to execute signal processing other than accessing to the buffer memory. The clock XCK is always output to the servo control circuit 5 as the clock SCK independent of the clock switching signal (SW). An output of the dividing circuits 112 is fed to the signal processing circuit 7 and to a control circuit 113. The control circuit 113 includes two counters 113a and 113b and a subtracting circuit 113c. One of the counters, i.e., an R-frame counter 113a, counts up the signal processing stage frame clock (MFS) which is supplied from the dividing circuits 112, and outputs a frame address of Re to the subtracting circuit 113c. The other counter, i.e., a W-frame counter 113b, counts up the reproduction stage frame clock (PFS) generated on the basis of the frame synchronizing signal of the EFM data read from the disc 1, and outputs the frame address of Wr to the subtracting circuit 113c. The subtracting circuit 113c calculates [Wr-Re], i.e., a difference N between a current write address to the buffer memory 22 and a current read address from the buffer memory 22, and generates the control signals DP and DM according to the difference N. Usually, the current write address to the buffer memory leads the current read address. For example, suppose that a jitter absorption capacity is 12 frames, the current write address leads the current read address by 6 or 7 frames. Therefore, the difference N is usually 6 or 7 frames.

The control signals DP and DM, according to the difference N, are generated as represented below.

control signal DP: set ("H") for N=1–3 ($f_{PFS} << f_{MFS}$) reset ("L") for N=7–12 control signal DM: set ("H") for N=10–12 ($f_{PFS} >> f_{MFS}$) reset ("L") for n=1–6

Therefore, in the case that synchronizing signals are incorrectly detected and a frequency of the clock PFS is lower than that of the clock MFS, reading speed exceeds writing speed and the difference N becomes lower. When the difference N decreases from 6 to 3, the control signal DP represents "H", and the clock generating circuit 110 works to decrease the frequency of the clock MFS by increasing a thinning-rate. When the difference N increases to 7, the signal DP represents "L", and the circuit 110 recovers the frequency of the clock MFS to its normal value.

In the opposite case, i.e., when the frequency of the clock PFS exceeds that of the clock MFS, the writing speed is faster, and the difference N becomes higher. When the difference N increases from 6 to 10, the control signal DM represents "H", and the clock generating circuit 110 works to increase the frequency of the clock MFS by decreasing the thinning rate. When the difference N decreases to 6, the signal DM represents "L", and the circuit recovers the frequency of the clock MFS to its normal value.

A control of the thinning-rate will be described in detail.

The clock PMCK is generated according to the control signals DP and DM in the following manner.

(1) In the case DP="L" and DM="L"

The clock PMCK is generated by thinning-out pulses at the rate of one bit per 49 bits of the clock VCOCK. Here, a period determined by 48 bits of the clock PMCK corresponds to a period determined by 49 bits of the clock VCOCK. Because dividing this PMCK, as the signal processing stage reference clock, by 2304 (48×48) corresponds to dividing the clock VCOCK by 2352 (49×48), the frequency of the clock MFS represents 7.35 kHz, which is the normal frequency.

(2) In the case DP="H" and DM="L"

The clock PMCK is generated by thinning-out pulses at the rate of two bits per 49 bits of the clock VCOCK. Here, a period determined by 48 bits of the clock PMCK corresponds to a period determined by 50 bits of the clock VCOCK. Because dividing this PMCK, as the signal processing stage reference clock, by 2304 (48×48) corresponds to dividing the clock VCOCK by 2400 (50×48), the frequency of the clock MFS represents 7.20 kHz, which is lower than the normal frequency.

(3) In the case DP="L" and DM="H"

The clock VCOCK is used as the clock PMCK, i.e., no thinning-out is performed. Therefore, a period determined by 48 bits of the clock PMCK is identical to a period determined by 48 bits of the clock VCOCK. Because dividing this PMCK, as the signal processing stage reference clock, by 2304 (48×48) corresponds to dividing the clock VCOCK by 2304 (48×48), the frequency of the clock MFS represents 7.50 kHz, which is higher than the normal frequency.

FIG. 9 shows a structure of the switching and thinning out circuit 111.

The circuit 111 includes a selector (SEL #1) and logic circuits, which include an AND gate (AN1), two divide-by-7 circuits (DIV.A and DIV.B), two flip-flops (FF1 and FF2), an OR gate (OR1) and a PMCKG generating circuit. The clock VCOCK generated by the PLL circuit 6 is supplied to one input of the AND gate (AN1). The clock switching signal (SW).from the system controller 8 is supplied to the other input of the AND gate (AN1), whose output signal is supplied to a first divide-by-7 circuit (DIV.A), clock inputs of flip-flops (FF1 and FF2) and one input of the OR gate (OR1). The flip-flops (FF1 and FF2) form a shift register. An output signal (QA) of the first divide-by-7 circuit (DIV.A) is input to a second divide-by-7 circuit (DIV.B), whose output signal (QB) is supplied to a first flip-flop (FF1) and the PMCKG generating circuit. An output signal of the first flip-flop (FF1) is supplied to a second flip-flop (FF2) and the PMCKG generating circuit, to which an inverted output (QN) of the second flip-flop (FF2) is also input. The PMCKG generating circuit further receives the control signals DP and DM generated by the subtracting circuit 113c. An output signal of the PMCKG generating circuit is fed to the other input of the OR gate (OR1). The selector has a first input (A0), to which the clock XCK generated by the crystal oscillator (not shown in this figure) at the frequency of 16.9344 MHz, is fed, a second input (A1), to which an output clock (PMCK) of the OR gate (OR1) is input, and a control input (S). to which the signal SW is input. An output signal of the selector serves as the signal processing stage reference clock (MCK). The selector selects the first input (A0) for "L" as the switching signal (SW). and selects the second input (A1) for "H".

FIG. 10 shows the PMCKG generating circuit, which has two AND gates (AN2 and AN3) and a selector (SEL #2).

The output signal (Q) of the first flip-flop (FF1) and the inverted output signal (/Q, '/' means an inversion) of the second flip-flop (FF2) are fed to inputs of a first AND gate (AN2). An output signal of the first AND gate (AN2) is provided to an first input (A) of the selector (SEL #2). The inverted output signal (/Q) of the second flip-flop (FF2) and the output signal (QB) of the second divide-by-7 circuit are fed to inputs of a second AND gate (AN3). An output signal of the second AND gate (AN3) is to a second input (B) of the selector (SEL #2). An "L" signal is always input to a third input (C) of the selector (SEL #2), . The selector (SEL #2) selects the first input (A) for DP="L" and DP="L", the second input (B) for DP="H" and DM="L", and the third input (C) for DP="L" and DM="H", and outputs a selected signal as the signal PMCKG.

FIG. 11 is a timing chart for "H" as the switching signal (SW) to explain generation of the clock PMCK.

When the signal SW is "H", the output of the AND gate (AN1) is identical to the clock VCOCK, whose divided-by-49 signal is the output signal (QB) of the second divide-by-7 circuit (DIV.B). Thinning out a pulse of the clock VCOCK is performed by executing logical addition between the clock VCOCK and the signal PMCKG, which is obtained by following manner.

Figure 1:
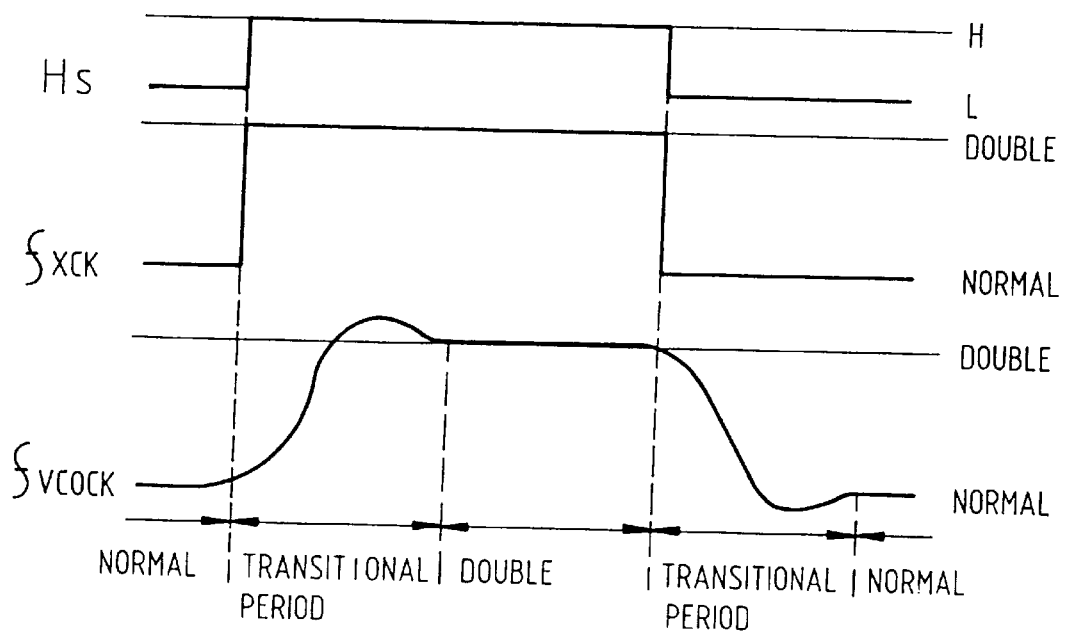
FIG. 1 is a timing chart showing the relationship between the frequency of a reproduction stage reference clock ($f_{vcock}$)

(1) In the case DP="L" and DM="L" (see FIG. 1) . . . PMCKG=(FF1Q)*(FF2/Q)

The clock PMCK is generated by thinning-out pulses at the rate of one bit per 49 bits of the clock VCOCK.

(2) In the case DP="H" and DM="L" (see FIG. 1) . . . PMCKG=(QB)* (FFQ2/Q)

The clock PMCK is generated by thinning-out pulses at the rate of two bits per 49 bits of the clock VCOCK.

(3) In the case DP-"L" and DM="H" (see FIG. 11) . . . PMCKG="L"

The clock VCOCK is used as the clock PMCK, i.e., no thinning-out is performed. Here, the divide-by-7 circuits (DIV.A and DIV.B) and the flip-flops (FF1 and FF2) do not work, and low power consumption is established. The servo control reference clock (SCK) is independent of the clock switching signal (SW). and is always identical to the crystal oscillator clock. For this reason, controls of the disc motor 2 and pickup 3 are never affected by a clock switching. When the signal SW changes from "L" to "H", an address for a jitter absorption area in the buffer memory 22 is set to a center address.

In this embodiment, while two counters 113a and 113b are provided in the clock generating circuit 110, it is instead possible to use two counters in the memory control circuit 26 of the signal processing circuit 7 instead of the counters in the clock generating circuit 110.

While, in the clock generating circuit according to this second embodiment, the rate of thinning-out pulses is 0, 1, and 2 for 49 VCOCK bits, these rate are not limited to such values.

In the second embodiment described here, when the signal SW represents "L", reading out from the buffer memory is performed in accordance with the frame clock XFS derived from a stable crystal oscillator clock, which is generated by the crystal oscillator. When the signal SW represents "H", the signal processing stage reference clock is derived from the PLL clock. Therefore, underflow or overflow do not occur during a transitional period of the disc motor caused by changing a reproduction rate or search operation.

Further, even under a condition where the synchronizing signal is not detected correctly due to missing of the synchronizing signal caused by scratches on the disc or wrong synchronizing signals caused by track jumps, underflow or overflow will not occur.

In the reproduction system described in the above embodiments, after the rate changing or search operations, subcode data are read out in synchronism with the clock PFS, and demodulated by the subcode demodulating circuit. If the demodulated subcodes are correct, outputs of the reproduced output signal can be started. An origin of the clock PFS, i.e., the reproduction stage reference clock (PCK), is generated by the PLL circuit. To reproduce information on the disc correctly and quickly, lock performance of the PLL circuit is important, however, look performance deviates among signal processing LSIs, because of a performance deviation of the voltage controlled oscillator (VCO) included in the PLL circuit. As a result, access time, which represents time to output valid data after reproduction rate changing or search operations, deviates among CD player sets. For example, suppose that the lock performance deviation is ranges from ±25% to ±40%, access time of a CD player set with a PLL circuit which can lock onto data in the range of ±40% is faster than that of a CD player set with a PLL circuit which can lock onto data in the range of ±25%. However, even if the PLL circuit locked onto data in the range of ±40%, the error rate would be large because of many errors in the signals read by the pickup. These errors are caused by vibration of the disc motor during the transitional period, in which revolution speed of the disc motor is changing.

These phenomena prevent CD player manufacturers from supplying CD player sets with the same performance. Now, a third embodiment of the present invention will be described for overcoming this problem.

The disc data reproducing apparatus and the signal processing circuit according to the third embodiment of the present invention employs circuitry for detecting speed of reproduction, and circuitry for determining whether data is valid or not according to the detection result. If the detection result, i.e., speed, is in an allowable range in which the PLL circuit can lock onto data, the data is designated as valid.

To suppress the performance deviation among CD player sets, the allowable range is set to a range of a PLL circuit with the worst lock performance, i.e., smallest lock range. For example, in the case that the allowable lock range is ±25%, even if the PLL circuit having a lock range of ±40% locks onto data at a frequency which deviates 35% from the center value, the data will nevertheless be designated as invalid. By utilizing above mentioned procedure, deviations of access time and error rate among CD player sets are minimized.

FIG. 12 is a block diagram of a disc data reproducing apparatus according to the third embodiment of the present invention. In this figure, the same elements as shown in in FIG. 2 are numbered by the same numbers. The disc 1 such as the CD (compact disc) is rotated by the disc motor 2. Recorded data on the disc 1 is read by the optical pickup 3, and the data read out is supplied to the RF circuit 4. The RF circuit 4 extracts the focus error signal and the tracking error signal (ERRs) from an output of the optical pickup 3, and supplies these extracted signals to the servo control circuit 5. Further, the RF circuit 4 quantizes the signal read from the disc 1 and supplies the PLL circuit 6 with the quantized signal as the EFM signal. The PLL circuit 6 generates a reproducing stage reference clock (VCOCK) synchronous with the EFM signal for demodulating the EFM signal in the following signal processing circuit 7. The PLL circuit 6 supplies the EFM signal and the clock VCOCK to the signal processing circuit 7. A center frequency of the clock VCOCK is 17.2872 MHz, which is four times a bit rate of the EFM signal, which is 4.3218 MHz. A clock used for reading the EFM signal is generated by dividing the clock VCOCK by 4 for the normal reproduction rate, and by dividing the clock VCOCK by 2 for the double reproduction rate.

The servo control circuit 5 comprises the focus servo control circuit, the tracking servo circuit, the spindle servo control circuit and the sled servo control circuit. The focus servo control circuit controls an optical focus of the pickup 3 to make the focus error signal equal to zero. The tracking servo control circuit controls an optical tracking of the pickup 3 to make the tracking error signal equal to zero. The spindle servo control circuit controls the disc motor 2, such as a spindle motor, which drives the disc 1 at a predetermined speed, or a constant line velocity. The sled servo control circuit moves the pick up 3 to a target track point for adjusting an actuator position of the tracking servo to a center position of its allowable moving range. (These detailed components of the servo control circuit are not shown in the drawings.)

The signal processing circuit 7 performs an EFM demodulation, a subcode demodulation and an error correction processing. The output of the circuit 7 is supplied to the DAC 9. An output of the DAC 9 is supplied to the LPF 10, and an output of the LPF 10 corresponds to a reproduced audio output signal. The ROM data, such as video information and character codes, is output from the signal processing circuit 7 as ROM data output without processing by the DAC 9 and the LPF 10.

A system controller 80 supplies the clock generating circuit 11 with control signals including a rate control signal (HS) and clock switching signal (SW). The system controller 80 also supplies the signal processing circuit 7 and the servo control circuit 5 with many other control signals for play, stop, search, attenuating, muting, etc. Here, the muting control signal for the signal processing circuit 7 is generated in accordance with the result of a detection of a reproduction speed detecting circuit 14. The system controller 80 generates the signal HS and the signal SW on the basis of control signals from the processor 12, which controls the whole system of the CD player. Information about the contents of the disc is obtained by reading TOC data on the disc. From TOC data, respective positions of the audio data and ROM data are obtained.

The system controller 80 also have two registers (not shown) to store the allowable lock range, i.e., the smallest lock range. One register stores an upper limit of the allowable range, the other stores a lower limit. These two registers are programmable to CD player manufacturers. For example, manufacturers can set the allowable lock range, i.e. the upper and lower limits, among CD player sets to the registers through the processor 12.

The processor 12 controls the system controller 80 to generate the signal HS and the signal SW in accordance with the required (designated) data. When the designated data is the audio data, the signal SW of "L" level is generated to prevent the signal processing stage clock from being switched. On the other hand, when the designated signal is the ROM data, the signal SW of "H" level is generated.

The clock generating circuit 11, according to the signal HS and the signal SW, generates the signal processing stage reference clock (MCK) from the crystal oscillator reference clock (XCK) or the reproduction stage reference clock (VCOCK). The crystal oscillator reference clock (XCK) is supplied from the crystal oscillator 13, and the reproduction stage reference clock (VCOCK) is the PLL clock generated by the PLL circuit 6. The crystal oscillator reference clock (XCK) is also fed to the reproduction speed detecting circuit 14, which detects the frequency of the reproduction stage reference clock using the crystal oscillator reference clock. On a result of the detection, the system controller 80 determines whether the data is valid or not, and outputs a valid/invalid flag (FS). If the data was determined as invalid, the control signal representing muting "ON" is output from the system controller 80.

Next, referring FIGS. 13 and 14, the reproduction speed detecting circuit 14 will be described.

FIG. 13 shows a block diagram of the reproduction speed detecting circuit 14, which has a divide-by-48 circuit 141, a divide-by-2352 circuit 142, a timing pulse generator 143, a 7-bit counter 144, an encoder 145, and a 4-bit latch circuit 146. The clock XCK (16.9344 MHz) supplied from the crystal oscillator 13 is fed to the divide-by-48 circuit 141, whose output signal (CCK) is at the frequency of 352.8 kHz and is fed to the timing pulse generator 143 and the counter 144. The clock VCOCK (center frequency 17.2872 MHz) supplied from the PLL circuit 6 is fed to the divide-by-2352 circuit 142, whose output signal (PFS) is at the center frequency of 7.35 kHz and is fed to the timing pulse generator 143. At the falling edge of the signal PCK, the timing pulse generator 143 generates a latch pulse (LP), and subsequently generates a clear pulse (CL). For example, the clear pulse (CL) is generated after the latch pulse with a delay of one pulse of the signal CCK. These pulses (CL and LP) are output to the 7-bit counter 144 and to the 4-bit latch circuit 146. The 7-bit counter 144 counts up the signal CCK, holds it value at 96, and is reset by the clear pulse (CL). The encoder 145 encodes 7-bit data (N) of the counter 144 to 4-bit data (M). The 4-bit latch circuit 146 latches the data (M) at the latch pulse (LP) and outputs the latched data (M) to the system controller 80.

Under a condition of a predetermined reproduction speed, because the frequency of the signal PFS is 7.35 kHz, a value (N) of the counter 144, at a rising edge of the latch pulse (LP), is 47((352.8/7.35)−1). A relationship between the frequency (f) of the signal PFS and the value (N) of the counter 144 is represented by an equation f=352.8/(N+1). The relationship between the encoded value (M), the value (N), the PFS frequency (f) and a deviation (D) from the center frequency of PFS is shown in Table 2.

TABLE 2

Relationship between M, N, f(kHz) and D (%)

| M | N | f(kHz) | D (%) |
|---|---|--------|-------|
| 0 | 0~33 | ~10.1 | ~37 |
| 1 | 34~35 | 10.1~9.5 | 37~30 |
| 2 | 36~37 | 9.5~9.0 | 30~23 |
| 3 | 38~39 | 9.0~8.6 | 23~17 |
| 4 | 40~41 | 8.8~8.2 | 17~12 |
| 5 | 42~43 | 8.2~7.8 | 12~7 |
| 6 | 44~45 | 7.8~7.5 | 7~2 |
| 7 | 46~47 | 7.5~7.2 | 2~−2 |
| 8 | 48~51 | 7.2~6.7 | −2~−9 |
| 9 | 62~55 | 6.7~6.2 | −9~−16 |
| 10 | 56~59 | 6.2~5.8 | −16~−21 |
| 11 | 60~63 | 5.8~5.4 | −21~−26 |
| 12 | 64~79 | 5.4~4.3 | −26~−41 |
| 13 | 80~95 | 4.3~3.6 | −41~−51 |
| 14 | 96~ | 3.6~ | −51~ |

Next, referring to FIG. 14, the operation timing of the reproduction speed detecting circuit 14 is explained.

At the timing 1, the timing pulse generator 143 detects a falling edge of the signal PCK and generates the latch pulse (LP). Here, the counter 144 outputs its value (N') to the encoder 145, and the latch circuit 146 latches the encoded value (M').

At the timing 2, the counter 144 is reset by the clear pulse (CL), however, the latch circuit 146 still holds its value (M').

At the timing 3, like at the timing 1, the timing pulse generator 143 detects a falling edge of the signal PCK and generates the latch pulse (LP). Here, the counter 144 outputs its value (N) to the encoder 145, and the latch circuit 146 latches the encoded value (M).

At the timing 4, like at the timing 2, the counter 144 is reset by the clear pulse (CL), however, the latch circuit 146 still holds its value (M).

As explained above, the reproduction speed detecting circuit 140 detects the speed, or the frequency of the clock PCK derived from the clock VCOCK, and outputs the result of detection to the system controller 80. For the determination, the system controller 80 has two registers, which hold an allowable lock range (L1~L2), and a calculator, which compares the value (M) to the value of the registers (L1 and L2). The values (L1 and L2) which represents the allowable lock range may be set by the processor 12. For example, and with reference to Table 2, if the allowable lock range is −25% to +25% (D) for the PLL circuit 6, the data is designated as valid if the output (M) of the latch circuit 146 is in the range of 3 to 10. If the data is designated as invalid, the data and its corresponding subcode are neglected. This means that, even if there no error is detected during the error correction processing, the data is designated as incorrective.

By utilizing the above mentioned process, deviations of access time and error rate among CD player sets are minimized.

In the third embodiment, although the signal PCK is generated from the clock VCOCK by the divide-by-2352 circuit, the signal PCK to be detected may be the reproduction stage frame clock (PFS) generated by the EFM demodulating circuit 21 (FIG. 3).

The reproduction speed detecting circuit 14 can be used effectively with other disc data reproduction systems in which access time is decisively determined by the lock performance of the PLL circuit. For example, the circuit 14 can be used in the system described in the second embodiment of the present invention and in a disc data reproduction system such as disclosed in Japanese patent application #92-359941, which corresponds to U.S. patent application Ser. No. 08/159,601 by Inagawa et al. The systems disclosed in these patent applications switch their reading frame clock derived from the crystal oscillator clock according to the difference between the current write address and read address of the buffer memory.

In such systems, because overflow and underflow do not occur, the access time is decisively affected by the lock performance of the PLL circuit. In contrast, in a conventional system, overflow or underflow occurs after the PLL circuit locks onto the data, because the frequency difference between writing and reading is relatively large. Once overflow or underflow occurs, continuity of the data is broken in the error correction process, the data is designated as invalid, and the play back of the data does not start. For this reason, the lock performance of the PLL circuit dose not significantly affect the data affects on access time in the conventional system.

Next a signal processing circuit formed on a semiconductor chip according to the present invention will be described with reference to FIG. 15.

In a semiconductor chip, a PLL circuit 6S, a clock generation circuit 11S, and a signal processing circuit 7S are formed. In the signal processing circuit 7S, an EFM demodulating circuit 21S, a buffer memory 22S, an error correction circuit 23S, a subcode demodulating circuit 24S and an output circuit 25S are formed and connected to a data bus. The buffer memory 22S is controlled by a memory control circuit 26S through control signals such as an address signal, address strobe signals and a read/write signal. The clock generation circuit 11S may be the clock generation circuit 11 according to the first embodiment or the clock generation circuit 110 according to the second embodiment of the present invention. On the semiconductor chip is also formed a DAC interface circuit 9S, to which clock signals (MFS, WDCK, LRCK and BCK) generated by the clock generating circuit 11S are supplied. These clock signals are fed to the DAC 9 (FIG. 2) through output terminals, and are used for signal processing in the DAC 9. Besides these circuits, the speed detecting circuit according to the third embodiment of the present invention may also be formed on the semiconductor chip. Further, the servo control circuit, the system controller, a CLV circuit, a digital filter, the DAC and other interface circuits may be formed on the same semiconductor chip.

The EFM demodulating circuit 21S generates a latch pulse (EFMLP) in response to detection of the sync pattern. Because the sync pattern is included in the EFM data which is synchronous with the clock VCOCK, the latch pulse EFMLP is in response to the clock VCOCK. The EFM demodulating circuit 21S latches demodulated EFM data in response to the latch pulse EFMLP.

The memory control circuit 26 (FIGS. 3 and 15) will be described in detail with reference to FIG. 16. The memory control circuit 26 includes a first selector 201, an OR gate 202, a W1 counter 203, an R1 counter 204, a second selector 205, a W2 counter 206, a Read Only Memory (ROM) 207 and a third selector 208, outputs of the EFM demodulating circuit 21S and the error correction circuit 23S are fed to a first input (A) and a second input (B) of the first selector 201, respectively. An output of the first selector 201 is provided to the buffer memory 22s as write-data. An EFM-WT signal which controls writing of the demodulated EFM signal is fed to a control input (S) of the first selector 201. The EFM-WT signal and an ERR.CORR.-WT signal generated by the error correction circuit 23S are fed to the OR gate 202, and an output signal of the OR gate 202 is provided to a Write/Read control input (W/R) of the buffer memory 22S. The clocks PFS and MFS are fed to the W1 counter 203 and the R1 counter 204, respectively, and outputs of these counters are fed to a first input (A) and a second input (B) of the second selector 205, respectively. An output of the second selector 205 is provided to the buffer memory, via the second selector 205, as a frame address. The latch pulse EFMLP is fed to the W2 counter 206. Outputs of the W2 counter 206 and the ROM 207 are fed to a first input (A) and a second input (B) of the third selector 208, respectively. An output of the third selector is fed to the buffer memory 22S as a symbol address.

When the demodulated EFM data is stored to the buffer memory 22S, the first, second and third selectors (201 , 205 and 208) select their first input (A) in accordance with an "H" level of the EFM-WT signal as the control input. Consequently, the output of the W1 counter 203 is fed to the buffer memory 22S as the frame address and the output of the W2 counter 206 is fed as the symbol address.

When corrected symbols are stored to the buffer memory 22S, the first, second and third selectors (201, 205 and 208) select their second input (B) in accordance with an "L" level of the EFM-WT signal as the control input. Consequently, the output of the R1 counter 204 is fed to the buffer memory 22S as the frame address and the output of the ROM 207 is fed as the symbol address.

The output of the R1 counter 204 is used to read all data in the buffer memory 22S as the frame address, and the output of the ROM 207 is used as the symbol address.

When the demodulated EFM data or the corrected symbols are stored to the buffer memory 22S, a signal of "H" level is fed to the Write/Read control input (W/R) through the OR gate 202.

FIG. 17 is a timing chart to show generation of the EFM-WT signal which controls writing of the demodulated EFM signal to the buffer memory.

In the memory control circuit 26, the EFM-WT signal is generated in response to the latch pulse (EFMLP) and a following possible memory accessing period "W" for demodulated EFM data writing, thereof. In particular, the EFM-WT signal is provided in synchronism with period W in response to the latch pulse EFMLP. Memory accessing periods are divided into four periods. One period is for the demodulated EFM demodulated data writing. The other three terms are for reading before the error correction, for writing after the error correction and for reading to output the reproduced data after the error correction.

Description about accessing the buffer memory will be provided in more detail. There are following six types of accesses to the buffer memory.

1) writing of demodulated EFM data . . . 32 symbols/frame
2) reading before C1 error correction . . . 32 symbols/frame
3) correction of erroneous symbols reading of erroneous symbols . . . 2 symbols/frame writing of corrected symbols . . . 2 symbols/frame
4) reading before C2 error correction . . . 28 symbols/frame
5) correction of erroneous symbols reading of erroneous symbols . . . 3 symbols/frame writing of corrected symbols . . . 3 symbols/frame
6) reading of reproduced data to output . . . 24 symbols/frame The ERR.CORR.-WT signal is generated by the error correction circuit in response to the writing of the corrected symbols in "accesses 3) and 4)".

All of the above accesses are executed during the memory accessing period which is in synchronism with the signal processing stage frame clock. However, as shown in FIG. 17, the EFM-WT signal which controls writing of the demodulated EFM data to the buffer memory is also generated in response to the latch pulse EFMLP generated in accordance with the reproduction stage reference clock (VCOCK) . Therefore, "access 1)" is in response to the reproduction stage reference clock (VCOCK) and the reproduction stage frame clock (PFS).

As described above, according to one feature of the present invention, the reading-out clock for the buffer memory 22 may be derived from the reproduction stage reference clock. Thus, overflow and underflow do not occur, the interruption of the data reproduction is very short, and the reproduced data is available before the disc motor reaches the required speed.

According to another feature of the present invention, the derivation of the reading-out clock for the buffer memory 22 may be controlled in accordance with the amount of data in the buffer memory.

According to the further feature of the present invention, the reproduction speed, i.e., the frequency of the reproduction stage clock, is detected, and the data is designated as valid or invalid.

While there has been illustrated and described what are present considered to be preferred embodiments of the present invention, it will be understood by those skilled in the art that various changes and modifications may be made, and equivalents may be substituted for devices thereof without departing from the true scope of the invention. In addition many modifications may be made to adapt a particular situation or material to the teaching of the present invention without departing from the central scope thereof. Therefore, it is intended that this invention not be limited to the particular embodiment disclosed as the best mode contemplated for carrying out this invention, but that the invention include all embodiments falling within the scope of the appended claims.

What is claimed is:

1. Apparatus for reproducing data stored on a disc, comprising:

means for rotating the disc;

pick up means for reading out data from the disc during rotation thereof;

means for generating a digitized signal by quantizing the read out disc data in accordance with rotation of the disc;

means for generating a first clock in response to the digitized signal;

means for demodulating the digitized signal in response to the first clock and for outputting demodulated data;

means for storing the demodulated data;

means for deriving a second clock from the first clock and for outputting the second clock as a reference clock; and memory controlling means for controlling a writing operation to the storing means in response to the first clock and for controlling a reading operation from the storing means in response to the reference clock, wherein the deriving means derives the second clock by a thinning out process of the first clock.

2. The apparatus according to claim 1, further comprising:

means for detecting the frequency of the first clock in accordance with an externally supplied constant clock; and means for determining the demodulated data as invalid when the detected frequency is out of a predetermined range.

3. The apparatus according to claim 2 wherein the determining means including:

means for storing the predetermined range.

4. The apparatus according to claim 1 wherein the deriving means comprising:

derivation controlling means for controlling a derivation of the second clock by the deriving means.

5. The apparatus according to claim 4 wherein the derivation controlling means controls the derivation of the second clock according to an amount of data stored in the storing means so that a frequency of the second clock is controlled in accordance with the amount of stored data.

6. The apparatus according to claim 5 wherein the derivation controlling means increases a thinning-out amount when the amount of the data is less than a first predetermined value, and the derivation controlling means decreases the thinning-out amount when the amount of the data is larger than a second predetermined value.

7. The apparatus according to claim 5 wherein the amount of data stored in the storing means is represented by a difference between current read and write addresses of the storing means.

8. The apparatus according to claim 7, further comprising:

first dividing means for dividing the first clock to generate a first frame clock; and second dividing means for dividing the reference clock to generate a second frame clock;

wherein the derivation controlling means includes:

first counter means for counting frames in the first frame clock as a first result;

second counting means for counting frames in the second frame clock as a second result; and means for calculating a difference between the first and second results.

9. Apparatus for reproducing data stored on a disc, comprising:

means for rotating the disc;

pickup means for reading out data from the disc during rotation thereof;

means for generating a digitized signal by quantizing the read out disc data in accordance with rotation of the disc;

means for generating a first clock in response to the digitized signal;

means for demodulating the digitized signal in response to the first clock and for outputting demodulated data;

means for storing the demodulated data;

means for deriving a second clock from the first clock and for outputting the second clock;

means for supplying a constant clock at a predetermined frequency;

means for selecting one of the second clock and the constant clock and for outputting the selected clock as a reference clock; and memory controlling means for controlling a writing operation to the storing means in response to the first clock and for controlling a reading operation from the storing means in response to the reference clock, wherein the deriving means derives the second clock by a thinning-out process of the first clock.

10. The apparatus according to claim 9, further comprising:

means for detecting the frequency of the first clock in accordance with the constant clock; and means for determining the demodulated data as invalid when the detected frequency is out of a predetermined range.

11. The apparatus according to claim 10 wherein the determining means includes:

means for storing the predetermined range.

12. The apparatus according to claim 9 wherein the deriving means comprises:

derivation controlling means for controlling a derivation of the second clock by the deriving means.

13. The apparatus according to claim 12 wherein the derivation controlling means controls the derivation of the second clock according to an amount of data stored in the storing means so that a frequency of the second clock is controlled in accordance with the amount of stored data.

14. The apparatus according to claim 13 wherein the derivation controlling means increases a thinning-out amount when the amount of the data is less than a first predetermined value, and the derivation controlling means decreases the thinning-out amount when the amount of the data is larger than a second predetermined value.

15. The apparatus according to claim 13, wherein the amount of data stored in the storing means is represented by a difference between current read and write addresses of the storing means.

16. The apparatus according to claim 15, further comprising:

first dividing means for dividing the first clock to generate a first frame clock; and second dividing means for dividing the reference clock to generate a second frame clock;

wherein the derivation controlling means includes:

first counter means for counting frames in the first frame clock as a first result;

second counting means for counting frames in the second frame clock as a second result; and means for calculating a difference between the first and second results.

17. The apparatus according to one of claims 9–16 wherein the rate of the first clock and the constant clock are 48/49, and the second clock is obtained by thinning out a pulse at a rate of one bit in 49 bits of the clock.

18. A signal processing circuit for use in processing data read from a rotating disc for storage in a buffer memory, comprising:
- a first clock generating circuit to generate a first clock responsive to a modulated signal generated by quantizing the data read from the rotating disc;
- a demodulator to demodulate the modulated signal in response to the first clock and to output demodulated data;
- a second clock deriving circuit to derive a second clock from the first clock by a thinning-out process of the first clock and to output the second clock as a reference clock; and
- a memory controlling circuit to control writing of the demodulated data to the buffer memory in response to the first clock and for controlling reading of the demodulated data from the buffer memory in response to the reference clock.

19. The signal processing circuit according to claim 18, further comprising:
- a first detector to detect a frequency of the first clock in accordance with an externally supplied constant clock; and
- a determining circuit to determine the demodulated data as invalid when the frequency is out of a predetermined range.

20. The signal processing circuit according to claim 18, further comprising the buffer memory.

21. A signal processing circuit for use in processing data read from a rotating disc for storage in a buffer memory, comprising:
- a first clock generating circuit to generate a first clock responsive to a modulated signal generated by quantizing the data read from the rotating disc;
- a demodulator to demodulate the modulated signal in response to the first clock and to output demodulated data;
- a second clock deriving circuit to derive a second clock from the first clock by a thinning-out process of the first clock and to output the second clock;
- a selector to select one of the second clock and an externally supplied constant clock at a predetermined frequency, and for outputting the selected clock as a reference clock; and
- a memory controlling circuit to control writing of the demodulated data to the buffer memory in response to the first clock and for controlling reading of the demodulated data from the buffer memory in response to the reference clock.

22. The signal processing circuit according to claim 21 wherein the deriving circuit comprises:
- a derivation controller to control a derivation of the second clock by the deriving circuit.

23. The signal processing circuit according to claim 22 wherein the derivation controller controls the derivation of the second clock according to an amount of data stored in the buffer memory so that a frequency of the second clock is controlled in accordance with the amount of store data.

24. The signal processing circuit according to claim 23 wherein the derivation controller increases a thinning-out amount when the amount of stored data is less than a first predetermined value, and the derivation controller decreases the thinning-out amount when the amount of stored data is larger than a second predetermined value.

25. The signal processing circuit according to claim 24 wherein the amount of stored data is represented by a difference between current read and write addresses of the buffer memory.

26. The signal processing circuit according to claim 25, further comprising:
- a first divider to divide the first clock to generate a first frame clock; and
- a second divider to divide the reference clock to generate a second frame clock,
wherein the derivation controller includes:
- a first counter to count up frames in the first frame clock as a first result;
- a second counter to count up frames in the second frame clock as a second result; and
- a subtractor to calculate a difference between the first and second results.

27. The signal processing circuit according to claim 26 wherein the second divider outputs at least one intermediate clock distinct from the second frame clock.

28. The signal processing circuit according to claim 27, further comprising:
- a digital/analog converter interface circuit with an intermediate clock output terminal for receipt of the intermediate clock.

29. The signal processing circuit according to claim 23 wherein the amount of stored data is represented by a difference between current read and write addresses of the buffer memory.

30. The signal processing circuit according to claim 29, further comprising:
- a first divider to divide the first clock to generate a first frame clock; and
- a second divider to divide the reference clock to generate a second frame clock,
wherein the derivation controller includes:
- a first counter to count up frames in the first frame clock as a first result;
- a second counter to count up frames in the second frame clock as a second result; and
- a subtractor to calculate a difference between the first and second results.

31. The signal processing circuit according to claim 30 wherein the second divider outputs at least one intermediate clock distinct from the second frame clock.

32. The signal processing circuit according to claim 31, further comprising:
- a digital/analog converter interface circuit with an intermediate clock output terminal for receipt of the intermediate clock.

33. The signal processing circuit according to claim 21 further comprising:
- a detector to detect a frequency of the first clock in accordance with the constant clock; and
- determining circuit to determine the demodulated data as invalid when the frequency is out of a predetermined range.

34. The signal processing circuit according to claim 33 wherein the determining circuit including:
- first and second registers holding the predeterined range.

35. The signal processing circuit according to claim 21, further comprising the buffer memory.

36. The signal processing circuit according to one of claims 21-35 and wherein the rate of the first clock and the constant clock are 48/49, and the second clock is obtained by thinning out a pulse at a rate of one bit in 49 bits of the clock.

37. A method for reproducing data stored on a disc, comprising the steps of:

reading out the disc data during rotation of the disc;

generating a digitized signal by quantizing the read out disc data in accordance with a rotation of the disc;

generating a first clock in response to the digitized signal;

demodulating the digitized signal in response to the first clock and outputting a demodulated data;

deriving a second clock from the first clock by a thinning-out process of the first clock and outputting the second clock as a reference clock; and writing the demodulated data to a buffer memory in response to the first clock; and reading the demodulated data from the buffer memory in response to the reference clock.

38. A method for reproducing data stored on a disc, comprising the steps of:

reading out disc data during rotation of the disc;

generating a digitized signal by quantizing the read out disc data in accordance with a rotation of the disc;

generating a first clock in response to the digitized signal;

demodulating the digitized signal in response to the first clock and outputting a demodulated data;

deriving a second clock from the first clock by a thinning-out process of the first clock;

selecting one of the second clock and a constant clock at a predetermined frequency as a reference clock;

writing the demodulated data to a buffer memory in response to the first clock; and reading the demodulated data from the buffer memory in response to the reference clock.

39. The method according to claim 38 wherein the rate of the first clock and the constant clock are 48/49, and the second clock is obtained by thinning out a pulse at a rate of one bit in 49 bits of the clock.

40. A signal processing circuit for use in reproducing a plurality of disc data stored on a rotating disc, the plurality of disc data capable of being classified into at least one of a first type data and a second type data, the reproduction of the plurality of data involving accesses to a buffer memory, comprising:

a PLL circuit for generating a VCO clock signal responsive to a modulated signal generated by binarizing data read from the rotating disc;

a demodulator for demodulating the modulated signal in response to the VCO clock signal, and for outputting demodulated data;

a thinning-out circuit for receiving the VCO clock signal, for conducting a thinning-out process on the VCO clock signal, and for outputting a thinned-out clock signal;

a selector for receiving a constant clock signal and the thinned-out clock signal, and for alternatively outputting one of the constant clock signal and the thinned-out clock signal as a reference clock signal, a frequency of the constant clock signal being different from a frequency of the VCO clock signal; and a memory controlling circuit for controlling writing of the demodulated data to the buffer memory in response to the VCO clock signal, and for controlling reading of the demodulated data from the buffer memory in response to the reference clock signal, wherein, when the disc data to be reproduced is the first type data, the selector outputs the thinned-out clock signal as the reference clock signal, and, when the disc data to be reproduced is the second type data, the selector outputs the constant clock signal as the reference clock signal.

41. The signal processing circuit according to claim 40 further comprising:

a first divider to divide the reference clock signal and to generate a plurality of intermediate clock signals and a reading frame clock signal, the first divider including a series of dividers;

wherein the data reproduction involves the intermediate clock signals.

42. The signal processing circuit according to claim 41 further comprising:

a second divider to divide the VCO clock signal and to generate a writing frame clock signal;

wherein a first division number of the first divider is different from a second division number of the second divider.

43. The signal processing circuit according to claim 42, wherein the first division number is 2304 and the second division number is 2352.

44. Apparatus for reproducing data stored on a disc, comprising:

means for rotating the disc;

pick up means for reading out data from the disc during rotation thereof;

means for generating a digitized signal by quantizing the read out disc data in accordance with rotation of the disc;

means for generating a first clock in response to the digitized signal;

means for demodulating the digitized signal in response to the first clock and for outputting demodulated data;

means for storing the demodulated data;

means for deriving a second clock from the first clock and for outputting the second clock as a reference clock; and memory controlling means for controlling a writing operation to the storing means in response to the first clock and for controlling a reading operation from the storing means in response to the reference clock, wherein the deriving means derives the second clock by a thinning-out process of the first clock when an amount of stored data is less than a first predetermined value and, the deriving means derives the second clock by a passing through process of the first clock when an amount of stored data is larger than a second predetermined value, so that a frequency of the second clock is controlled in accordance with the amount of stored data.

* * * * *